(12) United States Patent
Tian et al.

(10) Patent No.: US 8,532,410 B2
(45) Date of Patent: Sep. 10, 2013

(54) MULTI-VIEW VIDEO CODING WITH DISPARITY ESTIMATION BASED ON DEPTH INFORMATION

(75) Inventors: Doug Tian, Plainsboro, NJ (US); Purvin Bibhas Pandit, Franklin Park, NJ (US); Peng Yin, Ithaca, NY (US)

(73) Assignee: Thomson Licensing, Boulogne-Billancourt (FR)

( * ) Notice: Subject to any disclaimer, the term of this patent is extended or adjusted under 35 U.S.C. 154(b) by 300 days.

(21) Appl. No.: 12/736,588

(22) PCT Filed: Apr. 23, 2009

(86) PCT No.: PCT/US2009/002513
§ 371 (c)(1),
(2), (4) Date: Oct. 21, 2010

(87) PCT Pub. No.: WO2009/131688
PCT Pub. Date: Oct. 29, 2009

(65) Prior Publication Data
US 2011/0044550 A1    Feb. 24, 2011

Related U.S. Application Data

(60) Provisional application No. 61/125,520, filed on Apr. 25, 2008.

(51) Int. Cl.
*G06K 9/36* (2006.01)
*G06K 9/46* (2006.01)
(52) U.S. Cl.
USPC .......................................... 382/238; 382/232
(58) Field of Classification Search
USPC ................ 382/232–233, 236, 238, 245–248; 375/240.12, 240.26
See application file for complete search history.

(56) References Cited

U.S. PATENT DOCUMENTS 5,517,245 A    5/1996  Kondo et al.
5,767,907 A    6/1998  Pearlstein
(Continued)

FOREIGN PATENT DOCUMENTS

EP    1313329 A2    5/2003
GB    2418314 A     3/2006
(Continued)

OTHER PUBLICATIONS

Han Oh, "H.264-based Depth Map Sequence Coding Using Motion Information of Texture Video", Department of Information and Communications, 2006, 65 pages, Gwangju Institute of Science and Technology, Jun. 2006.

(Continued)

*Primary Examiner* — Li Liu
(74) *Attorney, Agent, or Firm* — Robert D. Shedd; Brian J. Cromarty

(57) ABSTRACT

Various implementations are described. Several implementations relate to one or more encoding modes that use depth information to determine a corresponding reference block. According to a general aspect, a portion of a first-view image from a first view in a multiple-view system is encoded. The portion is all or part of the first-view image. It is determined that a portion of a second-view image from a second view in the multiple-view system corresponds to the portion of the first-view image. The determination is based on a second-view depth value providing depth information for the portion of the second-view image. The portion of the second-view image is encoded using information from the encoding of the portion of the first-view image.

47 Claims, 14 Drawing Sheets

(56) References Cited

U.S. PATENT DOCUMENTS

| | | | |
|---|---|---|---|
| 6,188,730 | B1 | 2/2001 | Ngai et al. |
| 6,504,872 | B1 | 1/2003 | Fimoff et al. |
| 6,940,538 | B2 | 9/2005 | Rafey et al. |
| 7,003,136 | B1 | 2/2006 | Harville |
| 2003/0198290 | A1 | 10/2003 | Millin et al. |
| 2007/0030356 | A1 | 2/2007 | Yea et al. |
| 2007/0035530 | A1 | 2/2007 | Van Geest et al. |
| 2007/0088971 | A1 | 4/2007 | Walker et al. |
| 2007/0291850 | A1 | 12/2007 | Ishikawa et al. |
| 2009/0185616 | A1 | 7/2009 | Pandit et al. |
| 2009/0185627 | A1 | 7/2009 | Park et al. |
| 2010/0165077 | A1* | 7/2010 | Yin et al. ............... 348/42 |
| 2010/0188476 | A1 | 7/2010 | Thapa |
| 2010/0284466 | A1 | 11/2010 | Pandit et al. |

FOREIGN PATENT DOCUMENTS

| | | |
|---|---|---|
| JP | 9-261653 | 10/1997 |
| JP | 2000261828 | 9/2000 |
| JP | 2006-191357 | 7/2006 |
| JP | 2007-36800 | 2/2007 |
| JP | 2008-22549 | 1/2008 |
| WO | 2005/013623 A1 | 2/2005 |
| WO | 2006/064710 A1 | 6/2006 |
| WO | 2007/047736 A2 | 4/2007 |
| WO | 2007/126508 A2 | 11/2007 |
| WO | 2008/007913 A1 | 1/2008 |
| WO | 2008/133455 A1 | 11/2008 |
| WO | 2009/001255 A1 | 12/2008 |
| WO | 2009/089785 A1 | 7/2009 |
| WO | 2009/091383 A2 | 7/2009 |

OTHER PUBLICATIONS

Gang Zhu, et al., "Inter-view Skip Mode with Depth Information", Joint Video Team (JVT) of ISO/IEC MPEG & ITU-T VCEG (ISO/IEC JTCI/SC29/WG11 and ITU-T SG16 Q.6, Jan. 2008, pp. 1-9, JVT-Z029, Antalya, Turkey.

Anthony Vetro, et al., "Join Draft 3.0 on Multiview Video Coding", ISO/IEC JTC1/SC29/WG11 and ITU-T SG16 Q.6, Apr. 2007, pp. 1-39, JVT-W209, San Jose, USA.

Anthony Vetro et al., "Joint Draft 6.0 on Multiview Video Coding", JVT of ISO/IEC MPEG & ITU-T VCEG (ISO/IEC JTC1/SC29/WG11 and ITU-T SG16 Q6, Jan. 2008, pp. 1-41, JVT-Z209, Antalya, Turkey.

Anthony Vetro, et al., "Joint Multiview Video Mode (JMVM) 6.0", JVT of ISO/IEC MPEG & ITU-T VCEG (ISO/IEC JTC1/SC29/WG11 and ITU-T SG16 Q.6, Oct. 2007, pp. 1-10, JVT-Y207, Shenzhen, CN.

Sang-Tae Na, et al., "Multi-view Depth Video Coding using Depth View Synthesis", IEEE, 2008, pp. 1400-1403, Gwangju Institute of Science and Technology (GIST), Gwangju, Korea.

Philipp Merkle, et al., "Multi-View Video Plus Depth Representation and Coding", IEEE, 2007, pp. 1-201-1-204, Image Communication Group, Berlin, Germany.

Gang Zhu, et al., "MVC Inter-view Skip Mode with Depth Information", Video Communication Research Group, Apr. 13, 2010, pages.

Han-Suh Koo, et al., "MVC Motion Skip Mode", ISO/IEC MPEG & ITU-T VCEG (ISO/IEC JTC1/SC29/WG11 and ITU-T SG 16 Q.6), Apr. 2007, pp. 1-13, JVT-W081, Digital Media Research Lab., San Jose, California.

Thomas Wiegand, et al., Overview of the H.264/AVC Video Coding Standard, IEEE Transactions on Circuits and Systems for Video Technology, Jul. 2003, pp. 560-576, vol. 12, No. 7.

Sehoon Yea, et al., "Report on Core Experiment CE3 of Multiview Coding", ISO/IEC JTC1/SC29/WG11, Jul. 2006, 14 pages, Document M13695, Klagenfurt, Austria.

Stefan Grewatsch et al., "Sharing of Motion Vectors in 3D Video Coding", International Conference on Image Processing (ICIP), IEEE, 2004, pp. 3271-3274, University of Rostock, Institute of Comunications Engineering, Rostock, Germany.

Shinya Shimizu, et al., "View Scalable Multiview Video Coding Using 3-D Warping with Depth Map", IEEE Transactions on Circuits and Systems for Video Technology, Nov. 2007, pp. 14-85-1495, vol. 17, No. 11.

Karsten Muller, et al., "View Synthesis for Advanced 3D Video Systems", EURASIP Journal on Image and Video Processing, Nov. 2008, pp. 1-14, vol. 2008, Hindawi Publishing Corporation, Berlin, Germany.

Aljoscha Smolic, et al., "Intermediate View Interpolation Based on Multiview Video Plus Depth for Advanced 3D Video Systems", ICIP 2008, IEEE, pp. 2448-2451, Image Processing Department, Berlin, Germany.

Anthony Vetro, et al., "Towards a 3D video format for auto-stereoscopic displays", SPIE Conference on Applications of Digital Image Processing XXXI, Sep. 2008, 10 pages, Mitsubishi Electric Research Laboratories, Cambride, Massachusetts.

Han-Suh Koo, et al., "Presentation for JVT-W081, MVC Motion Skip Mode", Apr. 2007, San Jose, California.

International Telecommunication Union, "Advanced video coding for generic audiovisual services", ITU-T Telecommunication Standardization Sector of ITU, May 2003, pp. 1-282, H.264, Geneva, Switzerland.

International Telecommunication Union, "Advanced video coding for generic audiovisual services", ITU-T Telecommunication Standardization Sector of ITU, Mar. 2005, pp. 1-343, H.264, Geneva, Switzerland.

Erhan Ekmekcioglu, et al., "Bit-Rate Adaptive Downsampling for the Coding of Multi-View Video with Depth Information", IEEE, 3DTV-CON, May 2008, pp. 137-140, IEEE2008, Istanbul, Turkey.

Haitao Yang, et al., "CE1: Fine Motion Matching for Motion Skip Mode in MVC", Joint Video Team (JVT) of ISO/IEC MPEG & ITU-T VCEG (ISO/IEC JTC1/SC29/WG11 and ITU-T SG16 Q.6, Jan. 2008, pp. 1-14, Xidian University, Antalya, Turkey.

Ravi Krishnamurthy, et al., "Compression and Transmission of Depth Maps for Image-Based Rendering", IEEE, 2001, pp. 828-831, Sarnoff Corporation, Princeton, New Jersey.

Yannick Morvan, et al., "Depth-Image Compression Based on an R-D Optimized Quadtree Decomposition for the Transmission of Multiview Images", IEEE, 2007, V-105-V-108, University of Technology, Eindhoven, Netherlands.

Stefan Grewatsch et al., "Evaluation of Motion Compensation and Coding Strategies for Compression of Depth Map Sequences", Mathematics of Data/Image Coding, Compression and Encryption VII, Proc of SPIE, pp. 117-124, vol. 5561, 2004, Bellingham, Washington.

Emin Martinian, et al., "Extensions of H.264/AVC for Multiview Video Compression", ICIP, 2006 IEEE, pp. 2981-2984, Mitsubishi Electric Research Labs, Cambridge, Masachusetts.

Gang Zhu, et al., "Presentation for JVT-Z029—MVC Inter-view Skip Mode with Depth Information", Video Communication Research Group, 2011.

Gang Zhu, et al., "Presentation for JVT-Z029r1—MVC Interv-view Skip Mode with Depth Information", Video Communication Research, 2010.

Burak Ozkalayci, et al. "Multi-view Video Coding via Dense Depth Estimation", May 2007, 4 pages, Department of Electrical and Electronics Engineering, Middle East Technical University, Ankara, Turkey.

W.J. Tam, et al., "Smooting Depth Maps for Improved Stereoscopic Image Quality", Communications Research Centre Canada, Oct. 2004, 4 pages, Ontario, Canada.

Oliver Schreer, et al., "3D Videocommunication Algorithms, concepts and real-time systems in human centred communication", John Wiley & Sons, Ltd., Title Page Table of Contents, 2005, Berlin, Germany.

Philipp Merkle, et al., "Efficient Compression of Multi-View Depth Data Based on MVC", May 2007, 4 pages, Fraunhofer Institute for Telecommunications, Berlin, Germany.

Gang Zhu, et al., "Presentation for JVT-Z029—MVC Inter-view Skip Mode with Depth Information", 2008, Video Communication Research Group.

Gang Zhu, et al., "Presentation for JVT-Z029r1—MVC Inter-view Skip Mode with Depth Information", 2008, Video Communication Research.

* cited by examiner

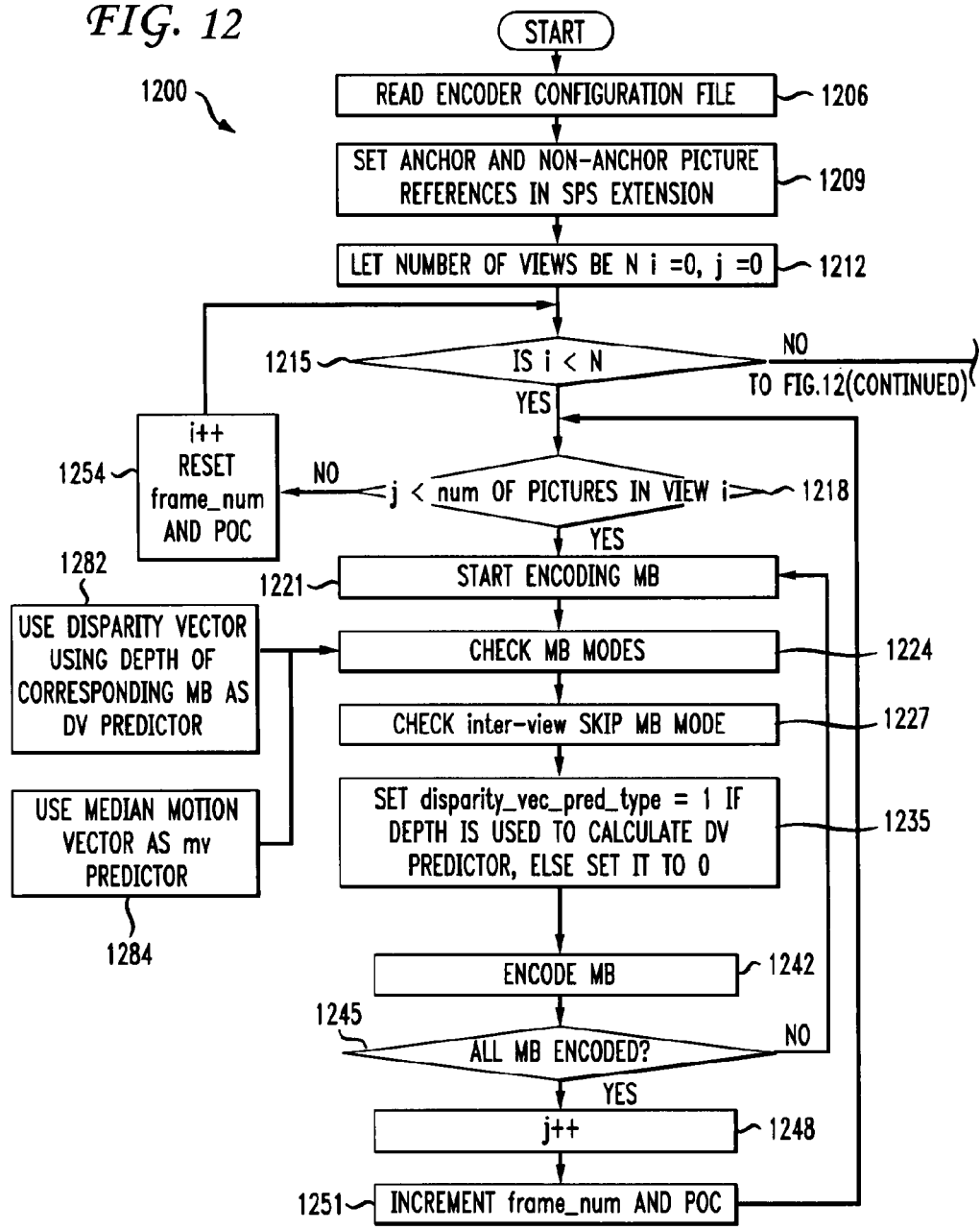

MULTI-VIEW VIDEO CODING WITH DISPARITY ESTIMATION BASED ON DEPTH INFORMATION

CROSS-REFERENCE TO RELATED APPLICATIONS

This application claims the benefit, under 35 U.S.C. §365 of International Application PCT/US2009/002513, filed Apr. 23, 2009, which was published in accordance with PCT Article 21(2) on Oct. 29, 2009 in English and which claims the benefit of U.S. provisional patent application No. 61/125,520, filed Apr. 25, 2008.

TECHNICAL FIELD

Implementations are described that relate to coding systems. Various particular implementations relate to inter-view skip modes with depth.

BACKGROUND

One or more coding tools exist that decode a current macroblock using information from another macroblock. One coding tool is inter-view skip mode that decodes the current macroblock using depth information. One or more disadvantages of the inter-view skip mode coding tool are identified in this application.

SUMMARY

According to a general aspect, a portion of a first-view image from a first view in a multiple-view system is encoded. The portion is all or part of the first-view image. It is determined that a portion of a second-view image from a second view in the multiple-view system corresponds to the portion of the first-view image. The determination is based on a second-view depth value providing depth information for the portion of the second-view image. The portion of the second-view image is encoded using information from the encoding of the portion of the first-view image.

According to another general aspect, a video signal or video signal structure includes the following sections. A first-view image section includes coded information for a portion of a first-view image from a first view in a multiple-view system. The portion of the first-view image is all or part of the first-view image. A second-view image section includes coded information for a portion of a second-view image from a second view in the multiple-view system that corresponds to the portion of the first-view image. A second-view depth section includes information for a second-view depth value providing depth information for the portion of the second-view image. The first-view image section, the second-view image section, and the second-view depth section are formatted according to a standard that supports coding of multiple views without supporting coding of depth maps.

According to another general aspect, an encoding of a portion of a first-view image from a first view in a multiple-view system is decoded. The portion is all or part of the first-view image. It is determined that a portion of a second-view image from a second view in the multiple-view system corresponds to the portion of the first-view image. The determination is based on a second-view depth value providing depth information for the portion of the second-view image. An encoding of the portion of the second-view image is decoded using information from the decoded portion of the first-view image.

The details of one or more implementations are set forth in the accompanying drawings and the description below. Even if described in one particular manner, it should be clear that implementations may be configured or embodied in various manners. For example, an implementation may be performed as a method, or embodied as apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

DETAILED DESCRIPTION

Inter-view skip is a coding tool that decodes the current macroblock using depth information. The inventors have determined that a drawback of inter-view skip is that it requires or assumes that the depth map is available at the decoder. This may be possible in a 3DV framework where the depth map is required for view synthesis. In the case of multi-view video coding (MVC), normative transmission of the depth map is not specified. As a result, a mode requiring the depth map cannot be used.

In at least one implementation, we propose a framework to use inter-view skip mode with depth. In at least one implementation, we propose to use the technique of inter-view skip as a coding mode for multi-view coding. At least one implementation described herein proposes a modification to this approach by transmitting the depth of the corresponding macroblock instead of, for example, transmitting the depth map separately. Depth information, generated from original video sequences and corresponding camera parameters, could bring benefits not only to view synthesis at the decoder end, but to coding efficiency at the encoder. With the help of depth information, the estimation of correspondence between two inter-view pictures could be more accurate than traditional methods. In at least one implementation, we introduce a new "skip mode", namely "Depth Skip Mode".

Thus, at least one problem addressed by at least some implementations is the efficient coding of multi-view video sequences using inter-view skip mode with depth. A multi-view video sequence is a set of two or more video sequences that capture the same scene from different view points.

Moreover, as mentioned above, in the case of multi-view video coding (MVC), normative transmission of the depth map is not specified. As a result, a mode requiring the depth map cannot be used. At least one implementation described herein solves this problem by explicitly sending the depth information (generally different from a depth map) when required. Note that "depth information" is a general term referring to various kinds of information about depth. One type of depth information is a "depth map", which generally refers to a per-pixel depth image. Other types of depth information include, for example, using a single depth value for each coded block rather than for each coded pixel.

Figure 1:
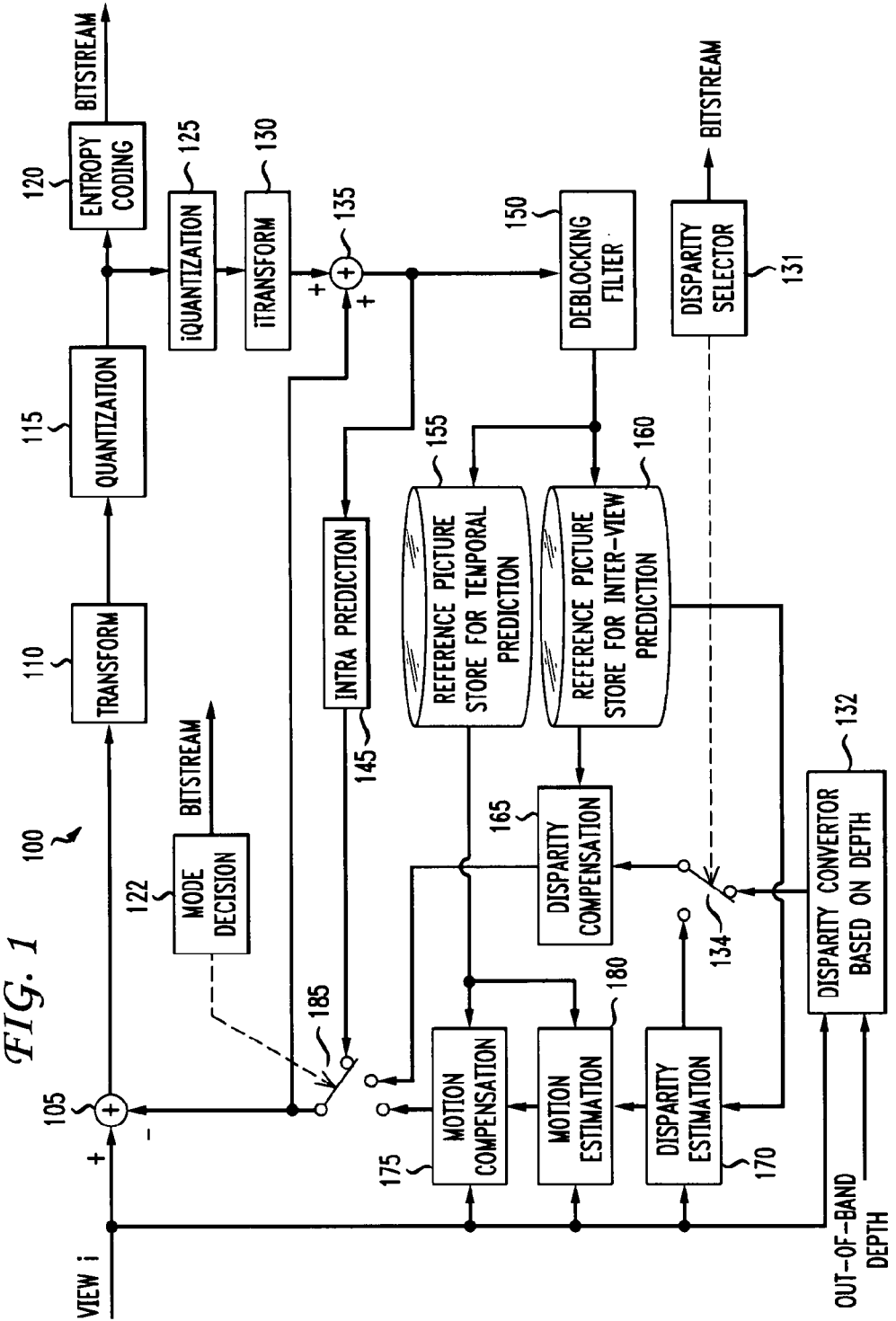
FIG. 1 is a diagram of an implementation of an encoder.

FIG. 1 shows an exemplary encoder 100 to which the present principles may be applied, in accordance with an embodiment of the present principles. The encoder 100 includes a combiner 105 having an output connected in signal communication with an input of a transformer 110. An output of the transformer 110 is connected in signal communication with an input of quantizer 115. An output of the quantizer 115 is connected in signal communication with an input of an entropy coder 120 and an input of an inverse quantizer 125. An output of the inverse quantizer 125 is connected in signal communication with an input of an inverse transformer 130. An output of the inverse transformer 130 is connected in signal communication with a first non-inverting input of a combiner 135. An output of the combiner 135 is connected in signal communication with an input of an intra predictor 145 and an input of a deblocking filter 150. The deblocking filter 150 removes, for example, artifacts along macroblock boundaries. A first output of the deblocking filter 150 is connected in signal communication with an input of a reference picture store 155 (for temporal prediction) and a first input of a reference picture store 160 (for inter-view prediction). An output of the reference picture store 155 is connected in signal communication with a first input of a motion compensator 175 and a first input of a motion estimator 180. An output of the motion estimator 180 is connected in signal communication with a second input of the motion compensator 175. A first output of the reference picture store 160 is connected in signal communication with a first input of a disparity estimator 170. A second output of the reference picture store 160 is connected in signal communication with a first input of a disparity compensator 165. An output of the disparity estimator 170 is connected in signal communication with a first input of a switch 134. An output of a disparity convertor (based on depth) 132 is connected in signal communication with a second input of the switch 134. A first output of a disparity selector 131 is connected in signal communication with a control input of the switch 134, for selecting either the first or the second input of the switch. An output of the switch 134 is connected in signal communication with a second input of the disparity compensator 165.

An output of the entropy decoder 120, a first output of a mode decision module 122, and an output of the disparity selector 131, are each available as respective outputs of the encoder 100, for outputting a bitstream. The disparity selector 131 may also be used to output various forms of depth information. Such depth information may be stored or transmitted, for example, and may be used, for example, to allow a decoding operation to determine a disparity vector for all or part of an encoded view.

A first input of the combiner 105, a third input of the motion compensator 175, a second input of the motion estimator 180, a second input of the disparity estimator 170, and a first input of the disparity converter 132 are each available as respective inputs to the encoders, for receiving picture data for view i. A second input of the disparity convertor 132 is available as an input to the encoder 100, for receiving out-of-band-depth.

An output of the motion compensator 175 is connected in signal communication with a first input of a switch 185. An output of the disparity compensator 165 is connected in signal communication with a second input of the switch 185. An output of the intra predictor 145 is connected in signal communication with a third input of the switch 185. An output of the switch 185 is connected in signal communication with an inverting input of the combiner 105 and with a second non-inverting input of the combiner 135. An output of the mode decision module 122 determines which input is provided to the switch 185.

Portions of FIG. 1 may also be referred to as an encoder, an encoding unit, or an accessing unit, such as, for example, blocks 110, 115, and 120, either individually or collectively. Similarly, blocks 125, 130, 135, and 150, for example, may be referred to as a decoder or decoding unit, either individually or collectively.

Figure 2:
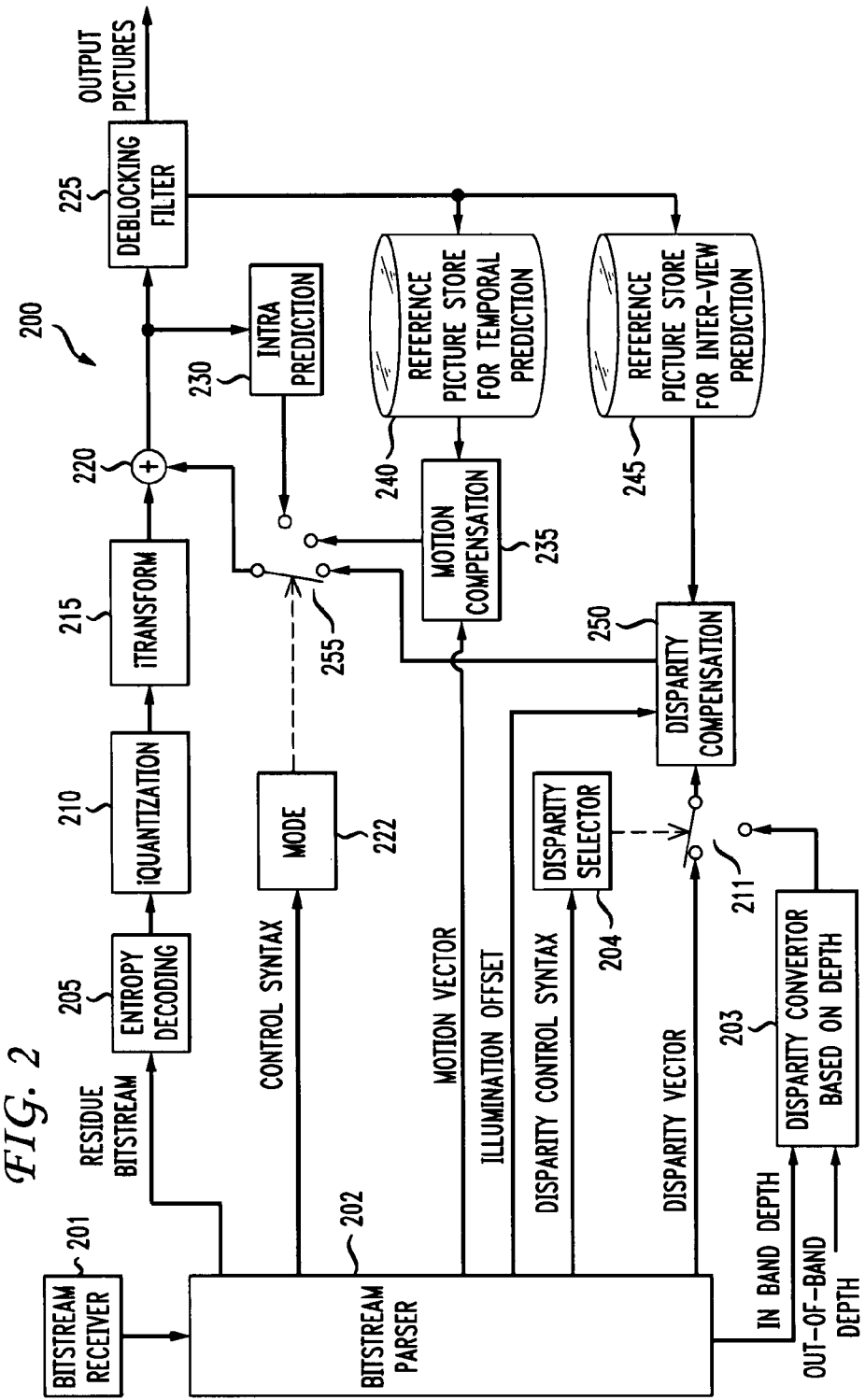
FIG. 2 is a diagram of an implementation of a decoder.

FIG. 2 shows an exemplary decoder 200 to which the present principles may be applied, in accordance with an embodiment of the present principles. The decoder 200 includes an entropy decoder 205 having an output connected in signal communication with an input of an inverse quantizer 210. An output of the inverse quantizer is connected in signal communication with an input of an inverse transformer 215. An output of the inverse transformer 215 is connected in signal communication with a first non-inverting input of a combiner 220. An output of the combiner 220 is connected in signal communication with an input of a deblocking filter 225 and an input of an intra predictor 230. A first output of the deblocking filter 225 is connected in signal communication with an input of a reference picture store 240 (for temporal prediction), and a first input of a reference picture store 245 (for inter-view prediction). An output of the reference picture store 240 is connected in signal communication with a first input of a motion compensator 235. An output of a reference picture store 245 is connected in signal communication with a first input of a disparity compensator 250.

An output of a bitstream receiver 201 is connected in signal communication with an input of a bitstream parser 202. A first output (for providing a residue bitstream) of the bitstream parser 202 is connected in signal communication with an input of the entropy decoder 205. A second output (for providing control syntax to control which input is selected by the switch 255) of the bitstream parser 202 is connected in signal communication with an input of a mode selector 222. A third output (for providing a motion vector) of the bitstream parser 202 is connected in signal communication with a second input of the motion compensator 235. A fourth output (for providing illumination offset) of the bitstream parser 202 is connected in signal communication with a second input of the disparity compensator 250. A fifth output (for providing disparity control syntax) of the bitstream parser 202 is connected in signal communication with an input of a disparity selector 204. A sixth output (for providing a disparity vector) of the bitstream parser 202 is connected in signal communication with a first input of a switch 211. A seventh output (for providing in-band depth) of the bitstream parser 102 is connected in signal communication with a first input of a disparity converter 203. An output of the disparity converter 203 is connected in signal communication with a second input of the switch 211. An output of the disparity selector 204 determines which input is provided to the switch 211. An output of the switch is connected in signal communication with a third input of the disparity compensator 250. It is to be appreciated that illumination offset is an optional input and may or may not be used, depending upon the implementation.

An output of a switch 255 is connected in signal communication with a second non-inverting input of the combiner 220. A first input of the switch 255 is connected in signal communication with an output of the disparity compensator 250. A second input of the switch 255 is connected in signal communication with an output of the motion compensator 235. A third input of the switch 255 is connected in signal communication with an output of the intra predictor 230. An output of the mode module 222 is connected in signal communication with the switch 255 for controlling which input is selected by the switch 255. A second output of the deblocking filter 225 is available as an output of the decoder 200. A second input of the disparity converter 203 is available as an input of the decoder 200, for receiving out-of-band depth.

Portions of FIG. 2 may also be referred to as an accessing unit, such as, for example, bitstream parser 202 and any other block that provides access to a particular piece of data or information, either individually or collectively. Similarly, blocks 205, 210, 215, 220, and 225, for example, may be referred to as a decoder or decoding unit, either individually or collectively.

Figure 3:
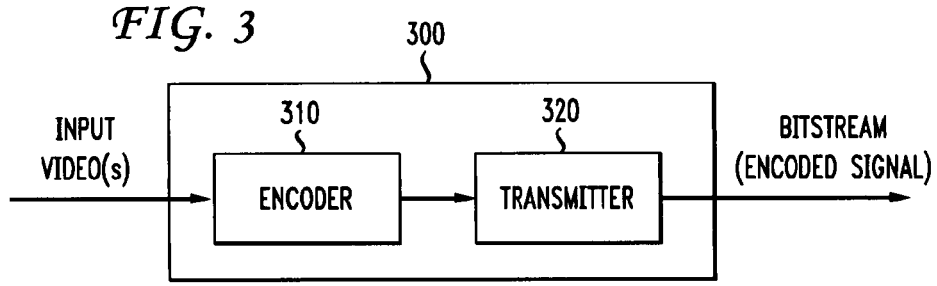
FIG. 3 is a diagram of an implementation of a video transmission system.

FIG. 3 shows an exemplary video transmission system 300, to which the present principles may be applied, in accordance with an implementation of the present principles. The video transmission system 300 may be, for example, a head-end or transmission system for transmitting a signal using any of a variety of media, such as, for example, satellite, cable, telephone-line, or terrestrial broadcast. The transmission may be provided over the Internet or some other network.

The video transmission system 300 is capable of generating and delivering video content encoded using inter-view skip mode with depth. This is achieved by generating an encoded signal(s) including depth information or information capable of being used to synthesize the depth information at a receiver end that may, for example, have a decoder.

The video transmission system 300 includes an encoder 310 and a transmitter 320 capable of transmitting the encoded signal. The encoder 310 receives video information and generates an encoded signal(s) there from using inter-view skip mode with depth. The encoder 310 may be, for example, the encoder 300 described in detail above. The encoder 310 may include sub-modules, including for example an assembly unit for receiving and assembling various pieces of information into a structured format for storage or transmission. The various pieces of information may include, for example, coded or uncoded video, coded or uncoded depth information, and coded or uncoded elements such as, for example, motion vectors, coding mode indicators, and syntax elements.

The transmitter 320 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers. The transmitter may include, or interface with, an antenna (not shown). Accordingly, implementations of the transmitter 320 may include, or be limited to, a modulator.

Figure 4:
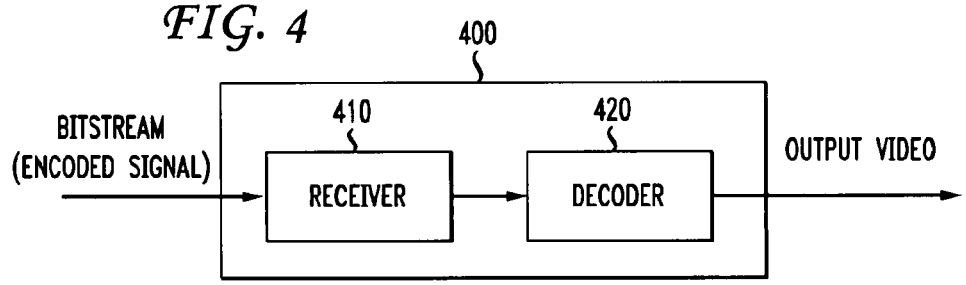
FIG. 4 is a diagram of an implementation of a video receiving system.

FIG. 4 shows an exemplary video receiving system 400 to which the present principles may be applied, in accordance with an embodiment of the present principles. The video receiving system 400 may be configured to receive signals over a variety of media, such as, for example, satellite, cable, telephone-line, or terrestrial broadcast. The signals may be received over the Internet or some other network.

The video receiving system 400 may be, for example, a cell-phone, a computer, a set-top box, a television, or other device that receives encoded video and provides, for example, decoded video for display to a user or for storage. Thus, the video receiving system 400 may provide its output to, for example, a screen of a television, a computer monitor, a computer (for storage, processing, or display), or some other storage, processing, or display device.

The video receiving system 400 is capable of receiving and processing video content including video information. The video receiving system 400 includes a receiver 410 capable of receiving an encoded signal, such as for example the signals described in the implementations of this application, and a decoder 420 capable of decoding the received signal.

The receiver 410 may be, for example, adapted to receive a program signal having a plurality of bitstreams representing encoded pictures. Typical receivers perform functions such as, for example, one or more of receiving a modulated and encoded data signal, demodulating the data signal from one or more carriers, de-randomizing the energy in the signal, de-interleaving the data in the signal, and error-correction decoding the signal. The receiver 410 may include, or interface with, an antenna (not shown). Implementations of the receiver 410 may include, or be limited to, a demodulator.

The decoder 420 outputs video signals including video information and depth information. The decoder 420 may be, for example, the decoder 400 described in detail above.

Figure 5:
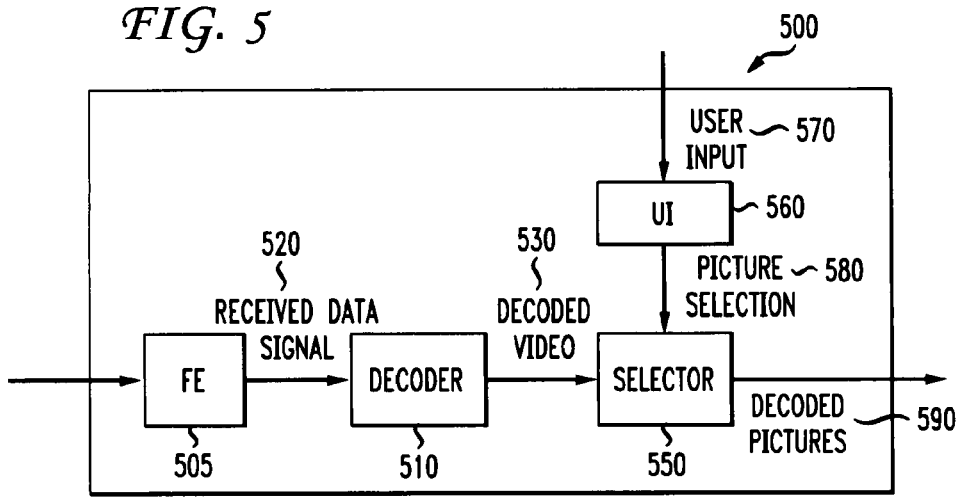
FIG. 5 is a diagram of an implementation of a video processing device.

FIG. 5 shows an exemplary video processing device 500 to which the present principles may be applied, in accordance with an embodiment of the present principles. The video processing device 500 may be, for example, a set top box or other device that receives encoded video and provides, for example, decoded video for display to a user or for storage. Thus, the video processing device 500 may provide its output to a television, computer monitor, or a computer or other processing device.

The video processing device 500 includes a front-end (FE) device 505 and a decoder 510. The front-end device 505 may be, for example, a receiver adapted to receive a program signal having a plurality of bitstreams representing encoded pictures, and to select one or more bitstreams for decoding from the plurality of bitstreams. Typical receivers perform functions such as, for example, one or more of receiving a modulated and encoded data signal, demodulating the data signal, decoding one or more encodings (for example, channel coding and/or source coding) of the data signal, and/or error-correcting the data signal. The front-end device 505 may receive the program signal from, for example, an antenna (not shown). The front-end device 505 provides a received data signal to the decoder 510.

The decoder 510 receives a data signal 520. The data signal 520 may include, for example, one or more Advanced Video Coding (AVC), Scalable Video Coding (SVC), or Multi-view Video Coding (MVC) compatible streams.

AVC refers more specifically to the existing International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "H.264/MPEG-4 AVC Standard" or variations thereof, such as the "AVC standard" or simply "AVC").

MVC refers more specifically to a multi-view video coding ("MVC") extension (Annex H) of the AVC standard, referred to as H.264/MPEG-4 AVC, MVC extension (the "MVC extension" or simply "MVC").

SVC refers more specifically to a scalable video coding ("SVC") extension (Annex G) of the AVC standard, referred to as H.264/MPEG-4 AVC, SVC extension (the "SVC extension" or simply "SVC").

The decoder 510 decodes all or part of the received signal 520 and provides as output a decoded video signal 530. The decoded video 530 is provided to a selector 550. The device 500 also includes a user interface 560 that receives a user input 570. The user interface 560 provides a picture selection signal 580, based on the user input 570, to the selector 550. The picture selection signal 580 and the user input 570 indicate which of multiple pictures, sequences, scalable versions, views, or other selections of the available decoded data a user desires to have displayed. The selector 550 provides the selected picture(s) as an output 590. The selector 550 uses the picture selection information 580 to select which of the pictures in the decoded video 530 to provide as the output 590.

In various implementations, the selector 550 includes the user interface 560, and in other implementations no user interface 560 is needed because the selector 550 receives the user input 570 directly without a separate interface function being performed. The selector 550 may be implemented in software or as an integrated circuit, for example. In one implementation, the selector 550 is incorporated with the decoder 510, and in another implementation, the decoder 510, the selector 550, and the user interface 560 are all integrated.

In one application, front-end 505 receives a broadcast of various television shows and selects one for processing. The selection of one show is based on user input of a desired channel to watch. Although the user input to front-end device 505 is not shown in FIG. 5, front-end device 505 receives the user input 570. The front-end 505 receives the broadcast and processes the desired show by demodulating the relevant part of the broadcast spectrum, and decoding any outer encoding of the demodulated show. The front-end 505 provides the decoded show to the decoder 510. The decoder 510 is an integrated unit that includes devices 560 and 550. The decoder 510 thus receives the user input, which is a user-supplied indication of a desired view to watch in the show. The decoder 510 decodes the selected view, as well as any required reference pictures from other views, and provides the decoded view 590 for display on a television (not shown).

Continuing the above application, the user may desire to switch the view that is displayed and may then provide a new input to the decoder 510. After receiving a "view change" from the user, the decoder 510 decodes both the old view and the new view, as well as any views that are in between the old view and the new view. That is, the decoder 510 decodes any views that are taken from cameras that are physically located in between the camera taking the old view and the camera taking the new view. The front-end device 505 also receives the information identifying the old view, the new view, and the views in between. Such information may be provided, for example, by a controller (not shown in FIG. 5) having information about the locations of the views, or the decoder 510. Other implementations may use a front-end device that has a controller integrated with the front-end device.

The decoder 510 provides all of these decoded views as output 590. A post-processor (not shown in FIG. 5) interpolates between the views to provide a smooth transition from the old view to the new view, and displays this transition to the user. After transitioning to the new view, the post-processor informs (through one or more communication links not shown) the decoder 510 and the front-end device 505 that only the new view is needed. Thereafter, the decoder 510 only provides as output 590 the new view.

The system 500 may be used to receive multiple views of a sequence of images, and to present a single view for display, and to switch between the various views in a smooth manner. The smooth manner may involve interpolating between views to move to another view. Additionally, the system 500 may allow a user to rotate an object or scene, or otherwise to see a three-dimensional representation of an object or a scene. The rotation of the object, for example, may correspond to moving from view to view, and interpolating between the views to obtain a smooth transition between the views or simply to obtain a three-dimensional representation. That is, the user may "select" an interpolated view as the "view" that is to be displayed.

Finding Inter-View Correspondence Using Depth Map

Let us assume that point M (x, y, z) (z is derived from a depth map) has a projection with coordinate (u1, v1) on the camera plane 1, and with coordinate (u2, v2) on the camera plane 2. The point (x, y, z) is from a real-world coordinate system that is independent of camera arrangement, and identifies the location of a 3D point. The point (u1, v1) is the projected coordinate of the 3D point (x, y, z) into the camera coordinate system of view 1. Similarly, the point (u2, v2) is the projected coordinate of the 3D point (x, y, z) into the camera coordinate system of view 2.

The project matrix P, is derived from camera parameters of K, R, and T as follows:

$$P = K \cdot [R|T] \quad (1)$$

where K is the Intrinsic Matrix, R is the Rotation Matrix, and T is the Translation Vector, and Equation 1 indicates that the matrix R is right merged by matrix T, and the result is multiplied by matrix K.

For view 1 and view 2, according to Equation (2) and Equation (3), the pixel (u2, v2) in view 2 could find its correspondence (u1, v1) in view 1. Here P1 and P2 represent the project matrixes of view 1 and view 2 as follows:

$$\begin{bmatrix} u_1 \\ v_1 \\ 1 \end{bmatrix} = P_1 \cdot \begin{bmatrix} x \\ y \\ z \\ 1 \end{bmatrix} \quad (2)$$

$$\begin{bmatrix} u_2 \\ v_2 \\ 1 \end{bmatrix} = P_2 \cdot \begin{bmatrix} x \\ y \\ z \\ 1 \end{bmatrix} \quad (3)$$

Each camera has a unique projection matrix P, shown as 3×4 matrices above. By left multiplying the projection matrix onto the world coordinates, we can obtain the coordinates in the camera coordinate system. Each camera produces its own set of equations.

Disparity Calculation and Depth Skip Mode

Although the above calculation is pixel based, at least one actual implementation only acquires the up-left pixel's correspondence of a whole macroblock as the disparity vector. For the current macroblock, with its up-left pixel (u1, v1), if its inter-view correspondence is pixel (u2, v2), then the disparity vector (DV) for the depth skip mode is as follows: DV=(u2−u1, v2−v1). The reference picture for this mode is set to be the first inter-view picture in the reference list 0. No residual needs to be transmitted.

The process of determining a DV at an encoder or decoder may typically include using (u1, v1) for a point in a picture, and using a depth value associated with (u1, v1), to determine the (x, y, z) location of the point in the picture. This is done using Equation 2. Then (x, y, z) are used in Equation 3 to determine (u2, v2) for the point. This process is called "warping", and is based on a depth value that may be, for example, coded or externally transmitted individually or as part of a depth map. Using the warping process, for each pixel (u1, v1) in view 1, we may typically identify a corresponding pixel (u2, v2) in view 2. Then DV is set to (u2−u1, v2−v1). DV may point to a corresponding block in a reference picture. If the corresponding block resembles the current block closely enough, then a "depth skip" mode can be used for coding the current block by copying the pixels from the corresponding block, as explained below.

As shown herein, the depth information can be used to generate a disparity vector.

Illumination Compensation in Depth Skip Mode

For traditional skip mode, the reference picture is from the same view, so there is no illumination change. However, when the reference picture comes from other views, illumination compensation (IC) can be taken into account. Thus, the offset of compensation for the illumination compensation in depth skip mode should be transmitted if the illumination compensation tool is enabled. The offset can be calculated in various manners, as is known in the art.

Embodiment 0 with Depth Data Transmitted Out of Band

TABLE 1A shows a modification of existing syntax structure from the MVC standard. The syntax of TABLE 1A can be used to signal the use of the Depth Skip Mode at the MacroBlock level. Illumination compensation is also signaled, as is the illumination compensation offset value. The modified portions are generally shown by italics. It is noted that macroblock_layer_mvc_extension( ) is supposed to replace macroblock_layer( ) which is called from slice_data( ).

TABLE 1A

| macroblock_layer_mvc_extension ( ) { | C | Descriptor |
|---|---|---|
| *if ( anchor_pic_flag && slice_type == P ) {* | | |
| *depth_skip_flag* | 2 | *u(1) \| ae(v)* |
| *} else {* | | |
| *depth_skip_flag = 0* | | |
| *}* | | |
| *if ( depth_skip_flag ) {* | | |
| *if (ic_enable){* | | |
| *mb_ic_flag* | 2 | *u(1) \| ae(v)* |
| *if( mb_ic_flag )* | | |
| *dpcm_of_dvic* | 2 | *ue(v) \| ae(v)* |
| *}* | | |
| *}else{* | | |
| mb_type | 2 | ue(v) \| ae(v) |
| if( mb_type = = I_PCM ) { | | |
| while( !byte_aligned( ) ) | | |
| pcm_alignment_zero_bit | 3 | f(1) |
| for( i = 0; i < 256; i++ ) | | |
| pcm_sample_luma[ i ] | 3 | U(v) |
| for( i = 0; i < 2 * MbWidthC * MbHeightC; i++ ) | | |
| pcm_sample_chroma[ i ] | 3 | u(v) |
| } else { | | |
| noSubMbPartSizeLessThan8x8Flag = 1 | | |
| if( mb_type != I_NxN && | | |
| MbPartPredMode( mb_type, 0 ) != Intra_16x16 && | | |
| NumMbPart( mb_type ) = = 4 ) { | | |
| sub_mb_pred( mb_type ) | 2 | |
| for( mbPartIdx = 0; mbPartIdx < 4; mbPartIdx++ ) | | |
| if( sub_mb_type[ mbPartIdx ] != B_Direct_8x8 ) { | | |
| if( NumSubMbPart( sub_mb_type[ mbPartIdx ] ) > 1 ) | | |
| noSubMbPartSizeLessThan8x8Flag = 0 | | |
| } else if( !direct_8x8_inference_flag ) | | |
| noSubMbPartSizeLessThan8x8Flag = 0 | | |
| } else { | | |
| if( transform_8x8_mode_flag && mb_type = = I_NxN ) | | |
| transform_size_8x8_flag | 2 | u(1) \| ae(v) |
| mb_pred( mb_type ) | 2 | |
| } | | |
| if( MbPartPredMode( mb_type, 0 ) != Intra_16x16 ) { | | |
| coded_block_pattern | 2 | me(v) \| ae(v) |
| if( CodedBlockPatternLuma > 0 && | | |
| transform_8x8_mode_flag && mb_type != I_NxN && | | |
| noSubMbPartSizeLessThan8x8Flag && | | |
| ( mb_type != B_Direct_16x16 \|\| direct_8x8_inference_flag) ) | | |
| transform_size_8x8_flag | 2 | u(1) \| ae(v) |
| } | | |
| if( CodedBlockPatternLuma > 0 \|\| CodedBlockPatternChroma > 0 \|\| | | |
| MbPartPredMode( mb_type, 0) = = Intra_16x16 ) { | | |
| mb_qp_delta | 2 | se(v) \| ae(v) |
| residual( 0, 15 ) | 3 \| 4 | |
| } | | |
| } | | |
| } | | |
| } | | | depth_skip_flag equal to 1 indicates that the coded macroblock is in depth skip mode. depth_skip_flag equal to 0 indicates that the coded macroblock is not in depth skip mode.

ic_enable equal to 1 specifies that illumination compensation is enabled for the current slice. ic_enable equal to 0 specifies that illumination compensation is not enabled for the current slice.

mb_ic_flag equal to 1 specifies that illumination compensation is used for the current macroblock. mb_ic_flag equal to 0 specifies that illumination compensation is not used for the current macroblock. The default value for mb_ic_flag is zero.

dpcm_of_dvic specifies the amount of illumination compensation offset to be used for the current macroblock.

In at least one implementation, we propose to improve the performance of depth skip mode. Since the assumption of that mode is that the depth data is available at the decoder, the overall bitrate required by this method is Bitrate(video)+Bitrate(depth). The additional bitrate for depth data is counted during coding optimization if the depth data is coded only to support the depth skip mode. Additionally, the multi-view video coding standard does not have support for transmitting the depth signal along with the video signal.

In order to address, at least in part, these two problems, we propose a solution to transmit the depth information along with the video signal.

Embodiment 1 with Depth Data Transmitted in Band

We assume that the depth data is available at the encoder for the each view. As mentioned in the process above, for one implementation the depth skip mode requires the depth value of the upper left pixel of a macroblock that is being coded as depth skip mode. Other implementations may use, for example, the bottom right pixel, or an average of all of the pixels in the block. In depth skip mode, this depth value is obtained from the corresponding pixel of the depth signal that corresponds to the current view.

The decision to select the mode of a macroblock may be based on rate-distortion optimization. Thus, not all macroblocks will be selected as depth skip mode. In spite of this, the depth data is assumed to be sent for the whole picture and for all pictures. This results in a high bitrate requirement for the overall multi-view system when the depth data is not needed for any other purposes such as, for example, a rendering purpose, etc.

We thus propose a method to significantly reduce this high bitrate requirement. Since depth skip mode is selected for only a certain percentage of macroblocks, we do not require sending the depth value for all pixels and for all pictures. Thus, we propose sending the depth value only for those macroblocks which use depth skip mode.

TABLE 1B

| macroblock_layer_mvc_extension ( ) { | C | Descriptor |
|---|---|---|
|   if ( anchor_pic_flag && slice_type == P ) { | | |
|     depth_skip_flag | 2 | u(1) \| ae(v) |
|   } else { | | |
|     depth_skip_flag = 0 | | |
|   } | | |
|   if ( depth_skip_flag) { | | |
|     depthd | 2 | se(v) \| ae(v) |
|   if (ic_enable){ | | |
|     mb_ic_flag | 2 | u(1) \| ae(v) |
|     if( mb_ic_flag ) | | |
|       dpcm_of_dvic | 2 | ue(v) \| ae(v) |
|   } | | |
|   }else{ | | |
|     mb_type | 2 | Ue(v) \| ae(v) |
|     if( mb_type == I_PCM ) { | | |
|       While( !byte_aligned( ) ) | | |
|         pcm_alignment_zero_bit | 3 | f(1) |
|       for( i = 0; i < 256; i++ ) | | |
|         pcm_sample_luma[ i ] | 3 | u(v) |
|       for( i = 0; i < 2 * MbWidthC * MbHeightC; i++ ) | | |
|         pcm_sample_chroma[ i ] | 3 | u(v) |
|     } else { | | |
|       noSubMbPartSizeLessThan8x8Flag = 1 | | |
|       if( mb_type != I_NxN && | | |
|         MbPartPredMode( mb_type, 0 ) != Intra_16x16 && | | |
|         NumMbPart( mb_type ) == 4 ) { | | |
|         sub_mb_pred( mb_type ) | 2 | |
|         for( mbPartIdx = 0; mbPartIdx < 4; mbPartIdx++ ) | | |
|           if( sub_mb_type[ mbPartIdx ] != B_Direct_8x8 ) { | | |
|             if( NumSubMbPart( sub_mb_type[ mbPartIdx ] ) > 1 ) | | |
|               noSubMbPartSizeLessThan8x8Flag = 0 | | |
|           } else if( !direct_8x8_inference_flag ) | | |
|             noSubMbPartSizeLessThan8x8Flag = 0 | | |
|       } else { | | |
|         if( transform_8x8_mode_flag && mb_type == I_NxN ) | | |
|           transform_size_8x8_flag | 2 | u(1) \| ae(v) |
|         mb_pred( mb_type ) | 2 | |
|       } | | |
|       if( MbPartPredMode( mb_type, 0 ) != Intra_16x16 ) { | | |
|         coded_block_pattern | 2 | me(v) \| ae(v) |
|         if( CodedBlockPatternLuma > 0 && | | |
|           transform_8x8_mode_flag && mb_type != I_NxN && | | |
|           noSubMbPartSizeLessThan8x8Flag && | | |
|           ( mb_type != B_Direct_16x16 \|\| direct_8x8_inference_flag ) ) | | |
|           transform_size_8x8_flag | 2 | u(1) \| ae(v) |
|       } | | |

TABLE 1B-continued

| macroblock_layer_mvc_extension ( ) { | C | Descriptor |
|---|---|---|
|     if( CodedBlockPatternLuma > 0 \|\| CodedBlockPatternChroma > 0 \|\| | | |
|         MbPartPredMode( mb_type, 0 ) = = Intra_16x16 ) { | | |
|         mb_qp_delta | 2 | se(v) \| ae(v) |
|         residual( 0, 15 ) | 3 \| 4 | |
|         } | | |
|       } | | |
|     } | | |
| } | | |

This is shown in TABLE 1B, in which the macroblock_layer_mvc_extension( ) structure is modified to send a depth_skip_flag and a coded value for the depth. When the depth_skip_flag is true we transmit an additional depth value for that macroblock. This is signaled by the syntax element depthd, which is shown in TABLE 1B. The semantics for this syntax element can be written as follows:

depthd specifies the difference between a depth value to be used and its prediction for the current macroblock.

depth_skip_flag equal to 1 indicates that the coded macroblock is in depth skip mode. depth_skip_flag equal to 0 indicates that the coded macroblock is not in depth skip mode. Its value is derived as 0 if the slice_type is not P or B.

Figure 6:
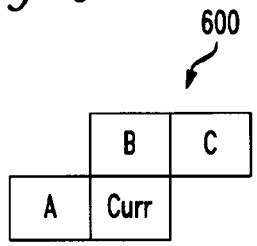
FIG. 6 is a diagram identifying, for an implementation, neighboring macroblocks with respect to a current macroblock.

The final, that is, reconstructed, depth for the current macroblock is derived as follows:
predDepth=Min(depthA, depthB),
when mbA is not present,
predDepth=depthB
when mbB is not present,
predDepth=depthA
when mbA and mbB are not present or no depth is associate with mbA and mbB,
predDepth=128
depth=predDepth+depthd Here depthA is the reconstructed depth signal of the left neighbor macroblock and depthB is the reconstructed depth signal of the top neighbor macroblock. depthA and depthB are single values. FIG. 6 shows the neighboring macroblocks, labeled "A", "B", and "C", with respect to a current macroblock labeled "Curr", in accordance with an embodiment of the present principles.

The depth skip mode does not transmit the residue for the macroblock, that is, the residue of the pixel values. This can be limiting and, thus, we propose that the depth skip mode be extended so that a residue is allowed to be sent for the macroblock. We call this the depth direct mode. Sending a residue may be done with or without the depth flag and depth information.

Figure 7:
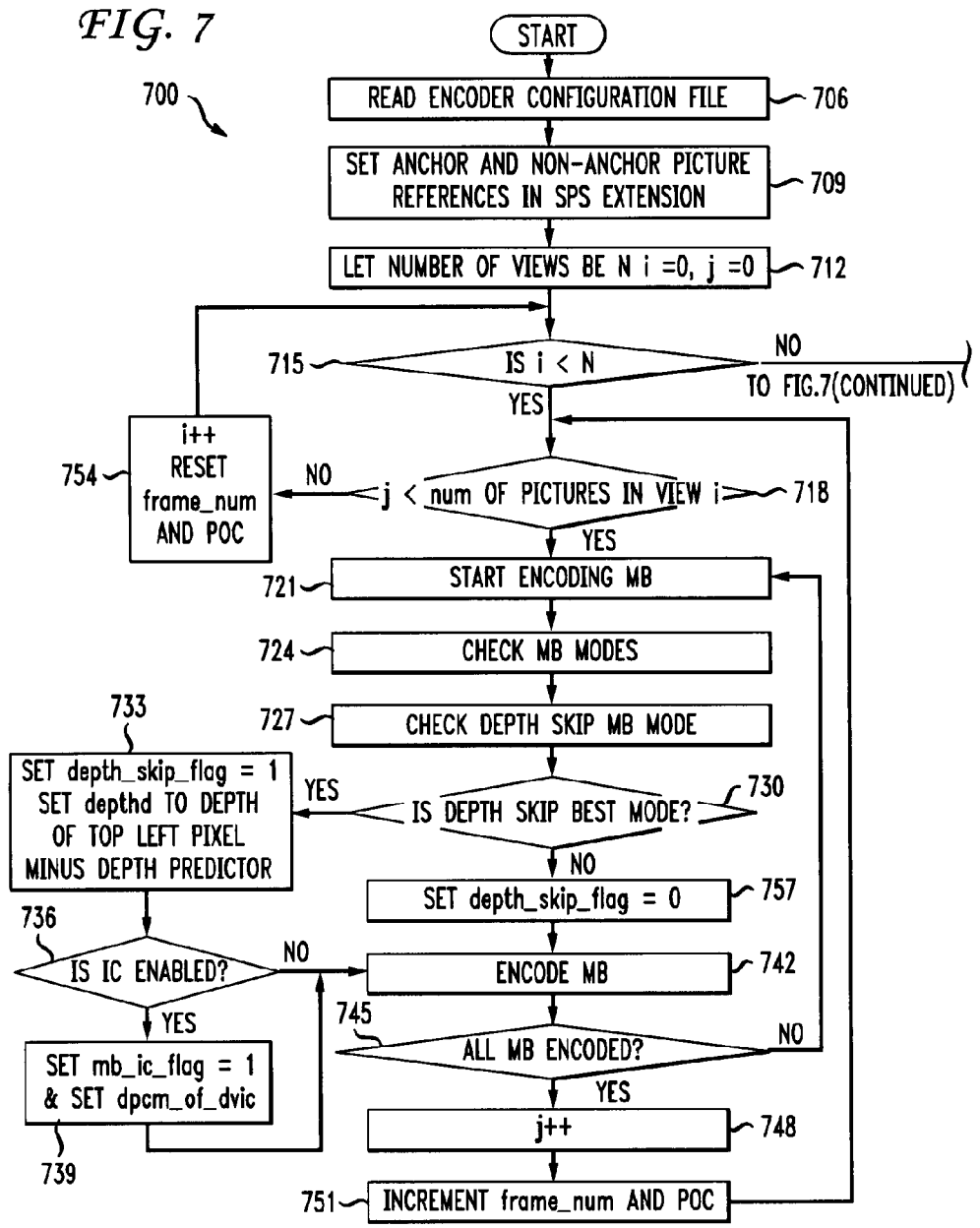
FIG. 7 is a diagram of an implementation of a first encoding process.
Figure 7:
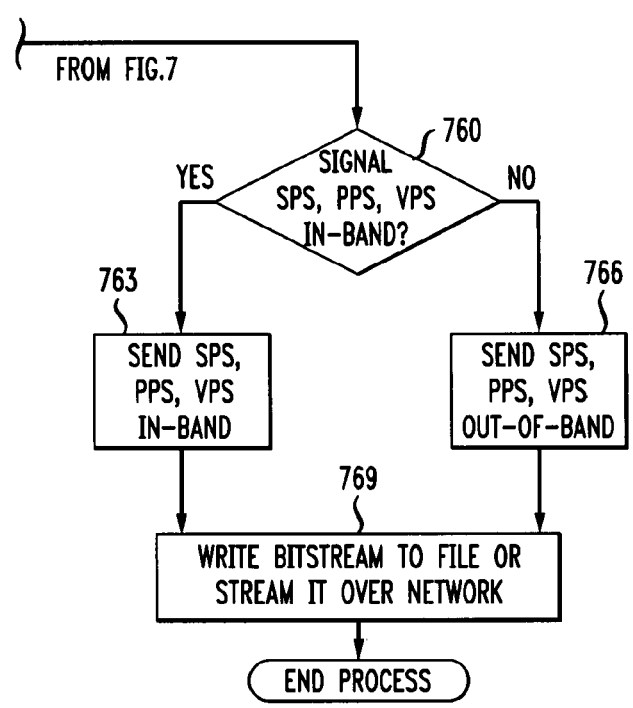

FIG. 7 is a flow diagram showing an exemplary method 700 for encoding using depth skip mode with depth in accordance with a first illustrative embodiment. At step 706, an encoder configuration file is read. At step 709, anchor and non-anchor picture references in the SPS extension are set. At step 712, the number of views is set equal to N, and variables i and j are initialized to zero. At step 715, it is determined whether or not i<N. If so, then control is passed to a step 718. Otherwise, control is passed to a step 760.

At step 718, it is determined whether or not j<number (num) of pictures in view i. If so, then control is passed to a step 721. Otherwise, control is passed to a step 754.

At step 721, encoding of a current macroblock is commenced. At step 724, macroblock modes are checked. At step 727, inter-view skip macroblock mode is checked. At step 730, it is determined whether or not inter-view skip is the best mode. If so, then control is passed to a step 733. Otherwise, control is passed to a step 757.

At step 733, depth_skip_flag is set equal to 1, and depthd is set to the depth of the top-left pixel minus the depth predictor. At step 736, it is determined whether or not illumination compensation is enabled. If so, then control is passed to a step 739. Otherwise, control is passed to a step 742.

At step 739, mb_ic_flag is set equal to 1 and dpcm_of_dvic is set. At step 742, the current macroblock is encoded. At step 745, it is determined whether or not all macroblocks have been encoded. If so, then control is passed to a step 748. Otherwise, control is returned to step 721.

At step 748, variable j is incremented. At step 751, frame_num and picture order count (POC) are incremented.

At step 754, variable i is incremented and frame_num and POC are reset.

At step 757, depth_skip_flag is set equal to 0.

At step 760, it is determined whether or not to signal the SPS, PPS, and/or VPS in-band. If so, then control is passed to a step 763. Otherwise, control is passed to a step 766.

At step 763, the SPS, PPS, and/or VPS are sent in-band.

At step 766, the SPS, PPS, and/or VPS are sent out-of-band.

At step 769, the bitstream is written to a file or streamed over a network.

Figure 8:
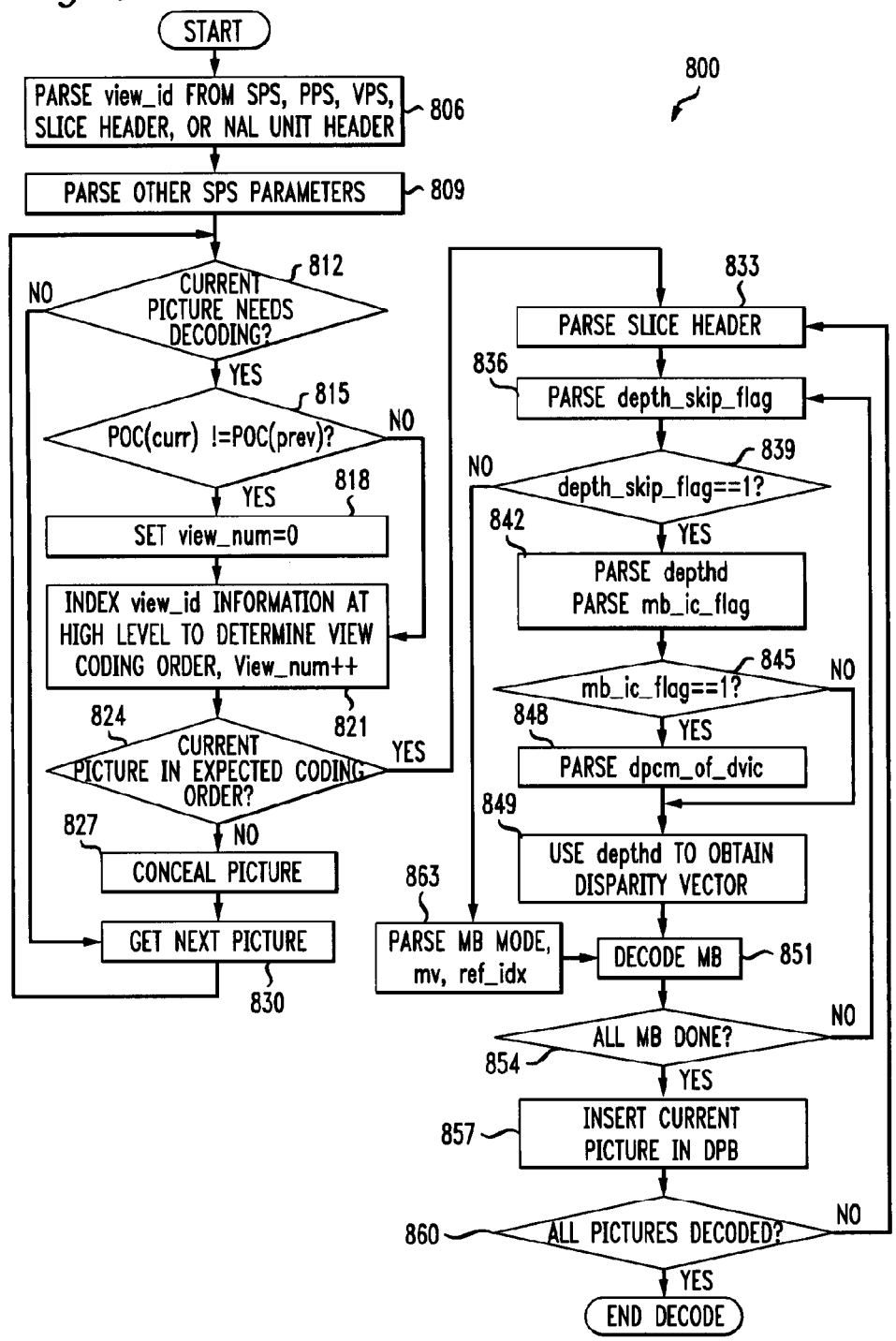
FIG. 8 is a diagram of an implementation of a first decoding process.

FIG. 8 is a flow diagram showing an exemplary method 800 for decoding using inter-view skip mode with depth in accordance with a first illustrative embodiment.

At step 806, view_id is parsed from the SPS, PPS, VPS, slice header, or network abstraction layer (NAL) unit header. At step 809, other SPS parameters are parsed. At step 812, it is determined whether or not the current picture needs decoding. If so, then control is passed to a step 815. Otherwise, control is passed to a step 830.

At step 815, it is determined whether or not POC(curr)!=POC(prev). If so, then control is passed to a step 818. Otherwise, control is passed to a step 821.

At step 818, view_num is set equal to 0. At step 821, view_id information is indexed at a high level to determine view coding order, and view_num is incremented.

At step 824, it is determined whether or not the current picture is in the expected coding order. If so, then control is passed to a step 833. Otherwise, control is passed to a step 827.

At step 833, the slice header is parsed. At step 836, depth_skip_flag is parsed. At step 839, it is determined whether or not depth_skip_flag is equal to 1. If so, then control is passed to a step 842. Otherwise, control is passed to a step 863.

At step 842, depthd and mb_ic_flag are parsed. At step 845, it is determined whether or not mb_ic_flag is equal to 1. If so, then control is passed to a step 848. Otherwise, control is passed to a step 849.

At step 848, dpcm_of_dvic is parsed. At step 849, depthd is used to obtain a disparity vector. At step 851, the current macroblock is decoded. At step 854, it is determined whether or not all macroblocks are done (being decoded). If so, then control is passed to a step 857. Otherwise, control is returned to step 836.

At step 857, the current picture is inserted in the decoded picture buffer (DPB). At step 860, it is determined whether or not all pictures have been decoded. If so, then decoding is concluded. Otherwise, control is returned to step 833.

At step 827, the current picture is concealed.

At step 830, the next picture is obtained.

At step 863, MB mode, mv, and ref_idx are parsed.

Embodiment 2

In this embodiment, we propose to modify the motion skip mode to use the depth information instead of using a global disparity vector (GDV).

In at least one implementation of the motion skip mode, the motion skip mode infers mode and motion information from a neighboring view using a global disparity vector. This disparity vector is calculated at the encoder and transmitted on each anchor picture. The disparity vectors of non-anchor pictures can then be derived from the GDV of the preceding and successive anchor pictures. The GDV is used to determine a corresponding macroblock or sub-macroblock in another view. We propose that instead of using this global disparity vector, a depth value be transmitted for the macroblock or sub-macroblock that selects motion skip mode. The depth value can be used to determine a disparity vector as explained earlier. This depth signal for the sub-macroblock and refining of the vector case is shown in TABLE 2. TABLE 2 shows a modification of syntax, by, for example, including "depthd" which is shown in italics.

sponding pixels can be copied even if the corresponding pixels are not on a macroblock or sub-macroblock boundary.

Figure 9:
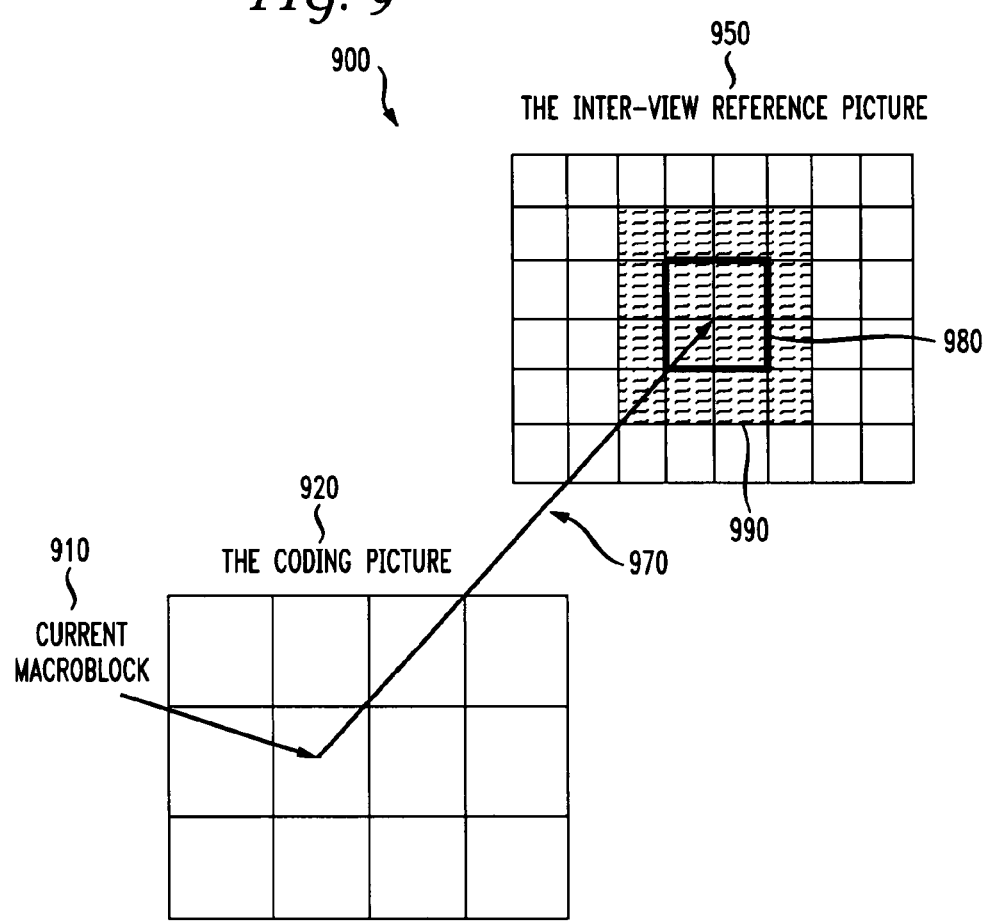
FIG. 9 is a diagram of an implementation of fine motion matching.

Additionally, a further search around this point can be conducted to refine the disparity vector. This is shown in FIG. 9. That is, FIG. 9 shows an example of fine disparity matching 900. The fine disparity matching involves a coding picture 920 having a current macroblock 910 to be coded therein, an inter-view reference picture 950, and an initial disparity vector 970 from the current macroblock 910 to a corresponding block 980 in the inter-view reference picture 950. A further search may be performed by, for example, doing a pixel-based comparison of 910 and 980, then moving the corresponding block 980 to different locations in the search area 990 (shown with shading) and selecting the block having the best pixel-based comparison. As shown in FIG. 9, the corresponding block 980 occupies the center portion of the shaded search area 990, with the corresponding block 980 being outlined with heavier lines.

At the decoder, a similar procedure is carried out where the decoded depth value is used to warp the current macroblock or sub-macroblock to a position in a neighboring view. In case a refinement is transmitted, the refinement is added to this position and then rounded off to the nearest macroblock or sub-macroblock position.

The mode and motion from the corresponding macroblock or sub-macroblock in the other view is used by the encoder to encode the current macroblock or sub-macroblock. The mode and motion information may, for example, point to a particular reference block/sub-block in a temporally different picture but from the same view as the current macroblock or sub-macroblock. Similarly, the decoder decodes the current macroblock or sub-macroblock with respect to the temporally-different macroblock or sub-macroblock (of the same view) pointed to by the derived motion information.

TABLE 2

| macroblock_layer( ) { | C | Descriptor |
|---|---|---|
| If ( ! anchor_pic_flag ) { | | |
|     Motion_skip_flag | 2 | U(1) \| ae(v) |
| } | | |
| If(motion_skip_flag) { | | |
|     *depthd* | 2 | *se(v)\|ae(v)* |
|     for( compIdx = 0; compIdx < 2; compIdx++ ) | | |
|         motion_info_offset_blk[compIdx] | 2 | ue(v) \| ae(v) |
|         if(num_non_anchor_refs_l0[view_id]>0&& | | |
|             num_non_anchor_refs_l1[view_id]>0 ) | | |
|         motion_ref_view_dir | 2 | U(1) \| ae(v) |
| } | | |
| Else { | | |
|     mb_type | 2 | ue(v) \| ae(v) |
|     ... | | |
| } | | |
| if( MbPartPredMode( mb_type, 0 ) != Intra_16x16 ) { | | |
|     coded_block_pattern | 2 | me(v) \| ae(v) |
|     ... | | |
| } | | |
| } | | |

At the encoder the mode decision will use the depth of the macroblock or sub-macroblock and warp it, as described earlier. This is equivalent to a disparity vector.

Figure 10:
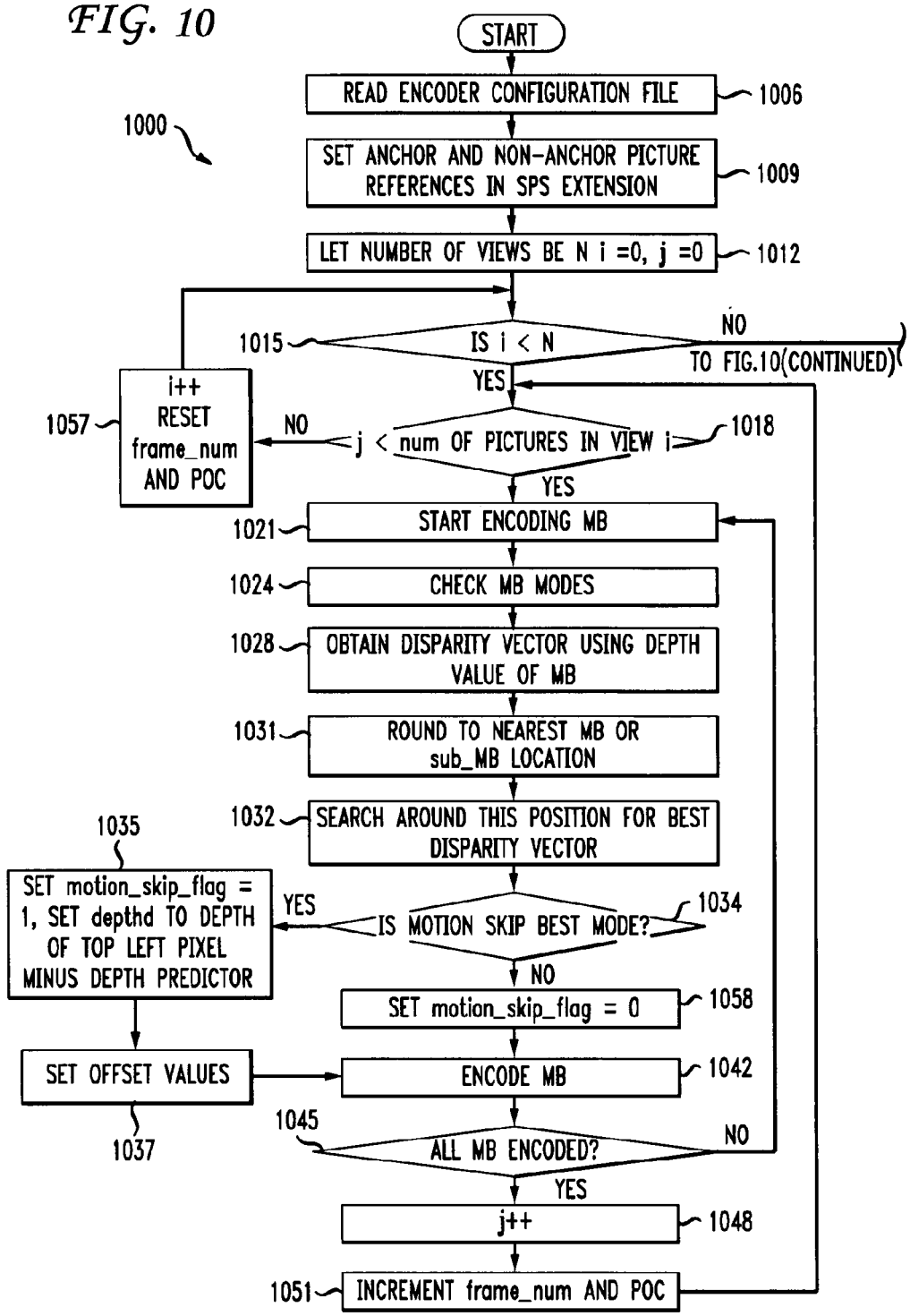
FIG. 10 is a diagram of an implementation of a second encoding process.
Figure 10:
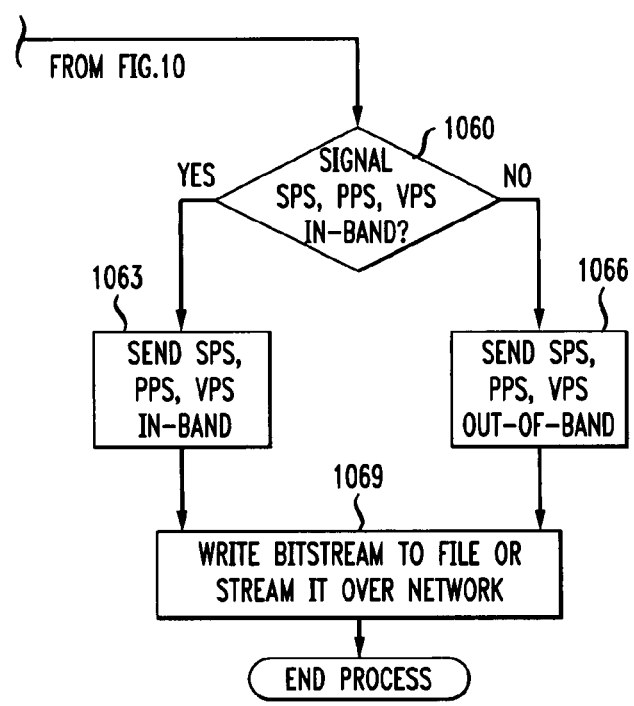

This warping will point to a location in the reference view. Since this location will not necessarily be aligned at a macroblock or sub-macroblock boundary (as required by motion skip mode), it may be rounded to the nearest macroblock or sub-macroblock boundary. Note that in depth-skip mode, such alignment is not strictly necessary because the corre- FIG. 10 is a flow diagram showing an exemplary method 1000 for encoding using motion skip mode with depth in accordance with a second illustrative embodiment. At step 1006, an encoder configuration file is read. At step 1009, anchor and non-anchor picture references in the SPS extension are set. At step 1012, the number of views is set equal to N, and variables i and j are initialized to 0. At step 1015, it is determined whether or not i<N. If so, then control is passed to a step 1018. Otherwise, control is passed to a step 1060.

At step 1018, it is determined whether or not j<number (num) of pictures in view i. If so, then control is passed to a step 1021. Otherwise, control is passed to a step 1057.

At step 1021, encoding of a current macroblock is commenced. At step 924, macroblock modes are checked. At step 1028, a disparity vector is obtained using the depth value of the macroblock (MB). At step 1031, the disparity vector is rounder to the nearest macroblock or sub-macroblock location. At step 1032, a search is performed around this (rounded) position for the best disparity vector. At step 1034, it is determined whether or not motion skip is the best mode. If so, then control is passed to a step 1035. Otherwise, control is passed to a step 1058.

At step 1035, motion_skip_flag is set equal to 1, and depthd is set to the depth of the top-left pixel minus the depth predictor. At step 1037, the offset values are set. At step 1042, the current macroblock is encoded. At step 1045, it is determined whether or not all macroblocks have been encoded. If so, then control is passed to a step 1048. Otherwise, control is returned to step 1021.

At step 1048, variable j is incremented. At step 1051, frame_num and picture order count (POC) are incremented.

At step 1057, variable i is incremented and frame_num and POC are reset.

At step 1058, motion_skip_flag is set equal to 0.

At step 1060, it is determined whether or not to signal the SPS, PPS, and/or VPS in-band. If so, then control is passed to a step 1063. Otherwise, control is passed to a step 1066.

At step 1063, the SPS, PPS, and/or VPS are sent in-band.

At step 1066, the SPS, PPS, and/or VPS are sent out-of-band.

At step 1069, the bitstream is written to a file or streamed over a network.

Figure 11:
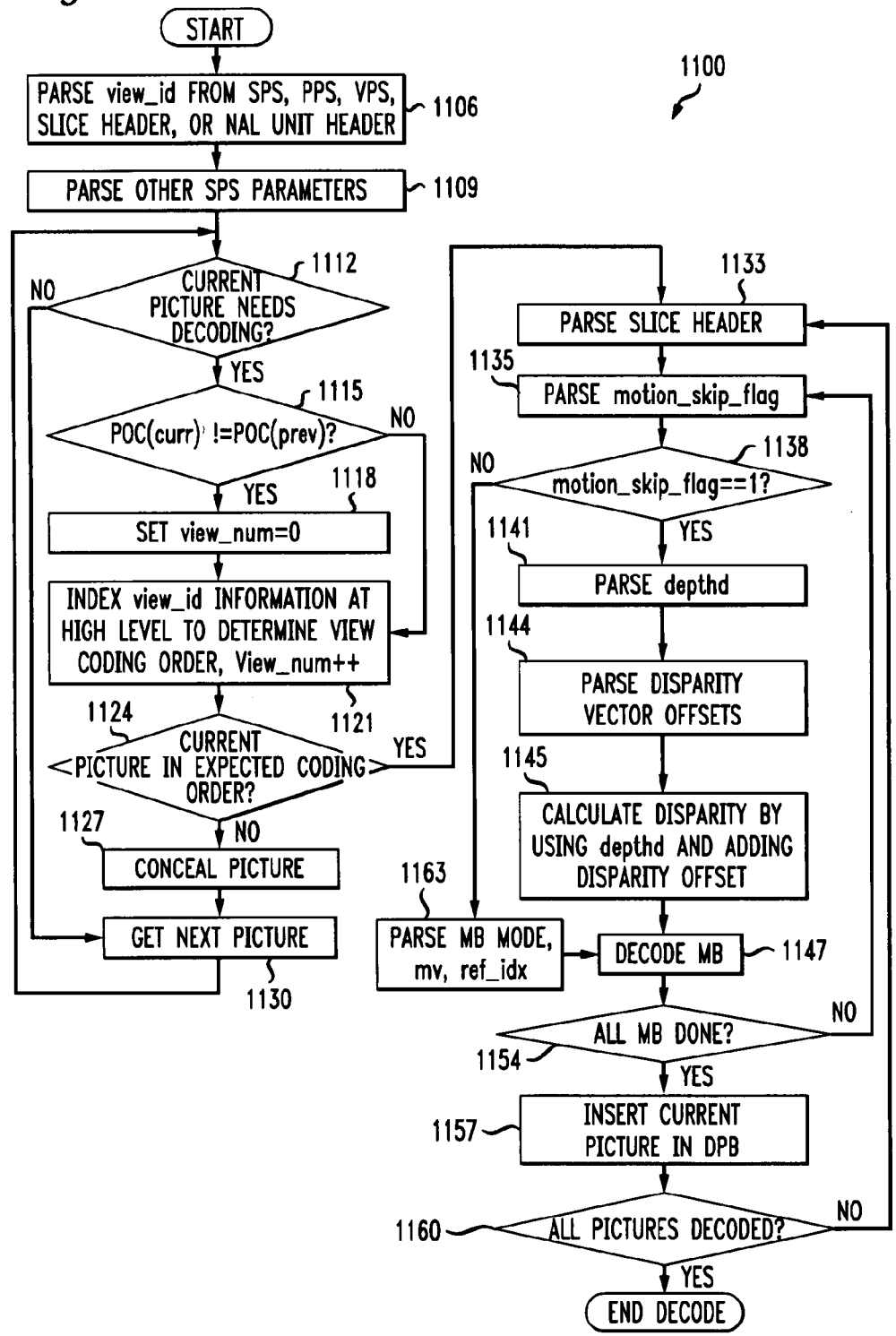
FIG. 11 is a diagram of an implementation of a second decoding process.

FIG. 11 is a flow diagram showing an exemplary method 1100 for decoding using inter-view skip mode with depth in accordance with a second illustrative embodiment.

At step 1106, view_id is parsed from the SPS, PPS, VPS, slice header, or network abstraction layer (NAL) unit header. At step 1109, other SPS parameters are parsed. At step 1112, it is determined whether or not the current picture needs decoding. If so, then control is passed to a step 1115. Otherwise, control is passed to a step 1130.

At step 1115, it is determined whether or not POC (curr)!=POC(prev). If so, then control is passed to a step 1118. Otherwise, control is passed to a step 1121.

At step 1118, view_num is set equal to 0. At step 1121, view_id information is indexed at a high level to determine view coding order, and view_num is incremented.

At step 1124, it is determined whether or not the current picture is in the expected coding order. If so, then control is passed to a step 1133. Otherwise, control is passed to a step 1127.

At step 1133, the slice header is parsed. At step 1135, motion_skip_flag is parsed. At step 1138, it is determined whether or not motion_skip_flag is equal to 1. If so, then control is passed to a step 1141. Otherwise, control is passed to a step 1163.

At step 1141, depthd is parsed. At step 1144, disparity vector offsets are parsed. At step 1145, the disparity is calculated by using depth and adding the disparity offset. At step 1147, the current macroblock is decoded. At step 1154, it is determined whether or not all macroblocks are done (being decoded). If so, then control is passed to a step 1157. Otherwise, control is returned to step 1135.

At step 1157, the current picture is inserted in the decoded picture buffer (DPB). At step 1160, it is determined whether or not all pictures have been decoded. If so, then the decoding is concluded. Otherwise, control is returned to step 1133.

At step 1127, the current picture is concealed.

At step 1130, the next picture is obtained.

At step 1163, MB mode, my, and ref_idx are parsed.

Embodiment 3

In motion vector prediction, a process is specified to determine which motion vector is used as a motion vector predictor. Similarly, for inter-view motion compensation, a disparity vector is used. In general, the same process used for motion vector prediction can be applied for disparity vector prediction. In addition, we propose to use the disparity vector that is converted from the depth value as an additional candidate for the disparity vector predictor.

We can signal the use of the warped value as the disparity vector predictor or the traditional median prediction as the disparity vector predictor. This is shown in TABLE 3 for macroblock level syntax and TABLE 4 for sub-macroblock level syntax.

TABLE 3

| mb_pred( mb_type ) { | C | Descriptor |
|---|---|---|
| if( MbPartPredMode( mb_type, 0 ) = = Intra_4x4 \|\| | | |
|     MbPartPredMode( mb_type, 0 ) = = Intra_8x8 \|\| | | |
|     MbPartPredMode( mb_type, 0) = = Intra_16x16 ) { | | |
|     if( MbPartPredMode( mb_type, 0 ) = = Intra_4x4 ) | | |
|         for( luma4x4BlkIdx=0; luma4x4BlkIdx<16; luma4x4BlkIdx++ ) { | | |
|             prev_intra4x4_pred_mode_flag[ luma4x4BlkIdx ] | 2 | u(1) \| ae(v) |
|             if( !prev_intra4x4_pred_mode_flag[ luma4x4BlkIdx ] ) | | |
|                 rem_intra4x4_pred_mode[ luma4x4BlkIdx ] | 2 | u(3) \| ae(v) |
|         } | | |
|     if( MbPartPredMode( mb_type, 0 ) = = Intra_8x8 ) | | |
|         for( luma8x8BlkIdx=0; luma8x8BlkIdx<4; luma8x8BlkIdx++ ) { | | |
|             prev_intra8x8_pred_mode_flag[ luma8x8BlkIdx ] | 2 | u(1) \| ae(v) |
|             if( !prev_intra8x8_pred_mode_flag[ luma8x8BlkIdx ] ) | | |
|                 rem_intra8x8_pred_mode[ luma8x8BlkIdx ] | 2 | u(3) \| ae(v) |
|         } | | |
|     if( ChromaArrayType != 0 ) | | |
|         intra_chroma_pred_mode | 2 | ue(v) \| ae(v) |
| } else if( MbPartPredMode( mb_type, 0 ) != Direct ) { | | |
|     *disparity_vec_pred_type* | 2 | *u(1)* \| *ae(v)* |
|     For( mbPartIdx = 0; mbPartIdx < NumMbPart( mb_type ); mbPartIdx++) | | |
|         if( ( num_ref_idx_l0_active_minus1 > 0 \|\| | | |
|             mb_field_decoding_flag ) && | | |

TABLE 3-continued

| mb_pred( mb_type ) { | C | Descriptor |
|---|---|---|
|         MbPartPredMode( mb_type, mbPartIdx ) != Pred_L1 )<br>           ref_idx_l0[ mbPartIdx ] | 2 | te(v) \| ae(v) |
|     For( mbPartIdx = 0; mbPartIdx < NumMbPart( mb_type ); mbPartIdx++)<br>        if( ( num_ref_idx_l1_active_minus1 > 0 \|\|<br>           mb_field_decoding_flag ) &&<br>        MbPartPredMode( mb_type, mbPartIdx ) != Pred_L0 )<br>           ref_idx_l1[ mbPartIdx ] | 2 | te(v) \| ae(v) |
|     For( mbPartIdx = 0; mbPartIdx < NumMbPart( mb_type ); mbPartIdx++)<br>        if( MbPartPredMode ( mb_type, mbPartIdx ) != Pred_L1 )<br>           for( compIdx = 0; compIdx < 2; compIdx++ )<br>               mvd_l0[ mbPartIdx ][ 0 ][ compIdx ] | 2 | se(v) \| ae(v) |
|     For( mbPartIdx = 0; mbPartIdx < NumMbPart( mb_type ); mbPartIdx++)<br>        if( MbPartPredMode( mb_type, mbPartIdx ) != Pred_L0 )<br>           for( compIdx = 0; compIdx < 2; compIdx++ )<br>               mvd_l1[ mbPartIdx ][ 0 ][ compIdx ] | 2 | se(v) \| ae(v) |
|     }<br>} | | |

TABLE 4

| sub_mb_pred( mb_type ) { | C | Descriptor |
|---|---|---|
|     *disparity_vec_pred_type* | 2 | *u(1)* \| ae(v) |
|     for( mbPartIdx = 0; mbPartIdx < 4; mbPartIdx++ )<br>        sub_mb_type[ mbPartIdx ] | 2 | ue(v) \| ae(v) |
|     for( mbPartIdx = 0; mbPartIdx < 4; mbPartIdx++ )<br>        if( ( num_ref_idx_l0_active_minus1 > 0 \|\| mb_field_decoding_flag ) &&<br>           mb_type != P_8x8ref0 &&<br>           sub_mb_type[ mbPartIdx ] != B_Direct_8x8 &&<br>           SubMbPredMode( sub_mb_type[ mbPartIdx ] ) != Pred_L1 )<br>           ref_idx_l0[ mbPartIdx ] | 2 | te(v) \| ae(v) |
|     for( mbPartIdx = 0; mbPartIdx < 4; mbPartIdx++ )<br>        if( (num_ref_idx_l1_active_minus1 > 0 \|\| mb_field_decoding_flag ) &&<br>           sub_mb_type[ mbPartIdx ] != B_Direct_8x8 &&<br>           SubMbPredMode( sub_mb_type[ mbPartIdx ] ) != Pred_L0 )<br>           ref_idx_l1[ mbPartIdx ] | 2 | te(v) \| ae(v) |
|     for( mbPartIdx = 0; mbPartIdx < 4; mbPartIdx++ )<br>        if( sub_mb_type[ mbPartIdx ] != B_Direct_8x8 &&<br>           SubMbPredMode( sub_mb_type[ mbPartIdx ] ) != Pred_L1 )<br>           for( subMbPartIdx = 0;<br>                subMbPartIdx < NumSubMbPart( sub_mb_type[ mbPartIdx ] );<br>                subMbPartIdx++)<br>                for( compIdx = 0; compIdx < 2; compIdx++ )<br>                    mvd_l0[ mbPartIdx ][ subMbPartIdx ][ compIdx ] | 2 | se(v) \| ae(v) |
|     for( mbPartIdx = 0; mbPartIdx < 4; mbPartIdx++ )<br>        if( sub_mb_type[ mbPartIdx ] != B_Direct_8x8 &&<br>           SubMbPredMode( sub_mb_type[ mbPartIdx ] ) != Pred_L0 )<br>           for( subMbPartIdx = 0;<br>                subMbPartIdx < NumSubMbPart( sub_mb_type[ mbPartIdx ] );<br>                subMbPartIdx++)<br>                for( compIdx = 0; compIdx < 2; compIdx++ )<br>                    mvd_l1[ mbPartIdx ][ subMbPartIdx ][ compIdx ] | 2 | se(v) \| ae(v) |
| } | | |

TABLE 3 and TABLE 4 include a new syntax element "disparity_vec_pred_type". The depth information can also be sent, for embodiments operating at the macroblock level or the sub-macroblock level.

The syntax disparity_vec_pred_type has the following semantics:

disparity_vec_pred_type indicates how to derive the disparity vector predictor for the current macroblock or sub-macroblock. disparity_vec_pred_type equal to 1 indicates that the disparity vector converted from the depth value is used as the disparity vector predictor. disparity_vec_pred_type equal to 0 indicates that the disparity vector obtained using the median predictor is used as the disparity vector predictor.

The following points may elaborate, at least in part, on concepts previously discussed and provide details of various implementations. Such implementations below may correspond to earlier implementations, or present variations and/or new implementations.

With respect to a first point, in depth skip mode, no residual coding may be needed and or depth may be sent out-of-band. A corresponding block may be determined in another view and those pixels may be used for a reconstruction of a current block (generally referring to a macroblock or a sub-macroblock). A flag may be sent indicating this coding mode and instructing the decoder to use the pixels from the corresponding block in the reconstructed reference view.

However, in many implementations, you need depth information for the current block in order to find the corresponding block. The depth information can be used, as is known, to generate a disparity vector. Accordingly, in various implementations we propose syntax for signaling the mode (we call it "depth skip mode") and we propose further modified syntax for also sending the depth info.

Note that many implementations use a depth predictor, so that we only need to send the depth difference.

With respect to a second point, another mode for encoding is motion skip mode ("MSM"). This mode looks to an inter-view block to get its motion data to describe the motion from a temporal reference. That is, the temporal-motion information from a block in a different view is borrowed by the current block. However, in motion skip mode, you generally use a global disparity vector to find the corresponding block in the other view. The global disparity vector is generally sent with the anchor picture for that group of pictures (GOP), and may not be the best disparity vector for any given block in the group of pictures. One or more implementations use depth information for a current block to get a pointer to the corresponding block from a different view. The depth information is used to generate a disparity vector that is based on the current block's depth data, rather than using a global disparity vector. Such implementations typically send the depth data in the bitstream, or out of band, so that the decoder can perform an analogous operation for decoding.

The disparity vector that is calculated from the depth information points to a corresponding block in another view. The motion information (for example, motion vector, reference picture index, etc.) from that corresponding block is then used for the current block. The motion information is used by the current block to point to a temporal reference that will be used to encode the current block.

With respect to a third point, in inter-view prediction, a view-motion vector is used to find the corresponding blocks in other views. The view-motion vector describes the difference (referred to as view-motion, or simply motion) between pictures (or portions of pictures) from different views at the same time instance. The view-motion vector points to the reference block in another view that is to be used to predictively encode the current block.

Given the similarity in concept between view-motion and temporal-motion, the view-motion vector is generally produced using, for example, conventional motion estimation techniques that are used to determine motion between pictures of the same view at different time instants. A view-motion vector ("V-MV") is often simply referred to as a disparity vector, but is typically not produced using depth data. A V-MV predictor ("V-MVP") is used as well, and the difference between the predictor and the V-MV is transmitted. This process is similar to generating a MV (in temporal prediction) but is being applied in the inter-view prediction scenario. In either scenario, however, the goal involves using prediction (temporal prediction or inter-view prediction), and notifying the decoder of the information needed to decode. We propose to modify the V-MVP. V-MVPs usually are generated based on the V-MVs from spatially neighboring blocks. For example, a median value may be used as the predictor.

However, in various implementations, we compute a disparity vector ("DV") based on the depth information of the current block. The DV is typically a good estimate of the block in another view that may most closely correspond to the current block, and the DV may be a better estimate than the V-MV. The block pointed-to by the DV is referred to as the corresponding block. Accordingly, several implementations also (or alternatively) use the DV in determining the V-MVP for the current block. As three examples, the V-MVP for the current block (1) may be set equal to the DV, (2) may be a function of the DV and one or more V-MVs from blocks that are spatial neighbors of the current block, or (3) may be a function of the V-MV from the corresponding block pointed-to by the DV. Note that the V-MV from the corresponding block may be relevant and useful in the calculation of the V-MVP if, for example, the cameras are regularly spaced apart or the motion of the object is constant.

In at least one implementation, the decoder performs the following operations: (1) receives the transmitted depth data for the current block, (2) calculates the DV, (3) finds the corresponding block pointed at by the DV, (4) possibly gets the V-MV from that corresponding block, (5) possibly gets the V-MVs from one or more spatially neighboring blocks of the current block, (6) calculates the V-MVP for the current block based on the one or more V-MVs and/or the DV, (7) receives the "difference" that was sent by the encoder, which is the encoder's determination of the difference between the V-MVP and the V-MV, (8) calculates the V-MV for the current block by adding the received "difference" to the calculated V-MVP, and (9) decodes the current block based on the block pointed to by the calculated V-MV for the current block. Implementations need not perform these recited operations in the order recited.

Figure 12:
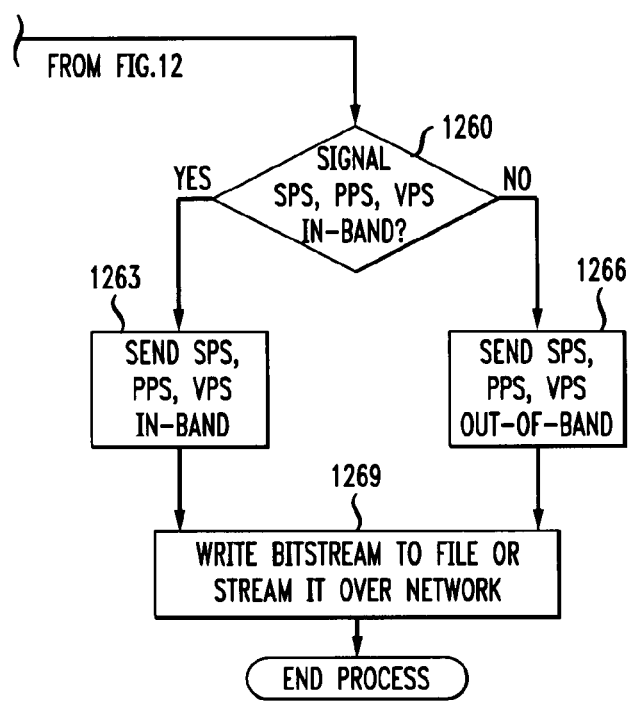
FIG. 12 is a diagram of an implementation of a third encoding process.

Yet another implementation simply uses the DV to find a corresponding block in another view. This corresponding block is then taken as the reference block for encoding the current block. This implementation works well, for example, if the corresponding block pointed to by the DV is a better reference than the corresponding block pointed to by the V-MV. This implementation avoids calculation of the V-MVP and the V-MV, and also avoids sending the "difference" (V-MVP−V-MV). FIG. 12 is a flow diagram showing an exemplary method 1200 for encoding using depth skip mode with depth in accordance with a third illustrative embodiment. At step 1206, an encoder configuration file is read. At step 1209, anchor and non-anchor picture references in the SPS extension are set. At step 1212, the number of views is set equal to N, and variables i and j are initialized to zero. At step 1215, it is determined whether or not i<N. If so, then control is passed to a step 1218. Otherwise, control is passed to a step 1260.

At step 1218, it is determined whether or not j<number (num) of pictures in view i. If so, then control is passed to a step 1221. Otherwise, control is passed to a step 1254.

At step 1221, encoding of a current macroblock is commenced. At step 1224, macroblock modes are checked. At step 1227, inter-view skip macroblock mode is checked. At step 1235, disparity_vec_pred_type is set equal to 1 if depth is used to calculate the disparity vector (DV) predictor; otherwise, it is set to 0. At step 1242, the current macroblock is encoded. At step 1245, it is determined whether or not all macroblocks have been encoded. If so, then control is passed to a step 1248. Otherwise, control is returned to step 1221.

At step 1248, variable j is incremented. At step 1251, frame_num and picture order count (POC) are incremented.

At step 1254, variable i is incremented and frame_num and POC are reset.

At step 1260, it is determined whether or not to signal the SPS, PPS, and/or VPS in-band. If so, then control is passed to a step 1263. Otherwise, control is passed to a step 1266.

At step 1263, the SPS, PPS, and/or VPS are sent in-band.

At step 1266, the SPS, PPS, and/or VPS are sent out-of-band.

At step 1269, the bitstream is written to a file or streamed over a network.

At step 1282, the disparity vector is used, using the depth of the corresponding macroblock as the disparity vector (DV) predictor.

At step 1284, the median motion vector is used as the motion vector (MV) predictor.

Figure 13:
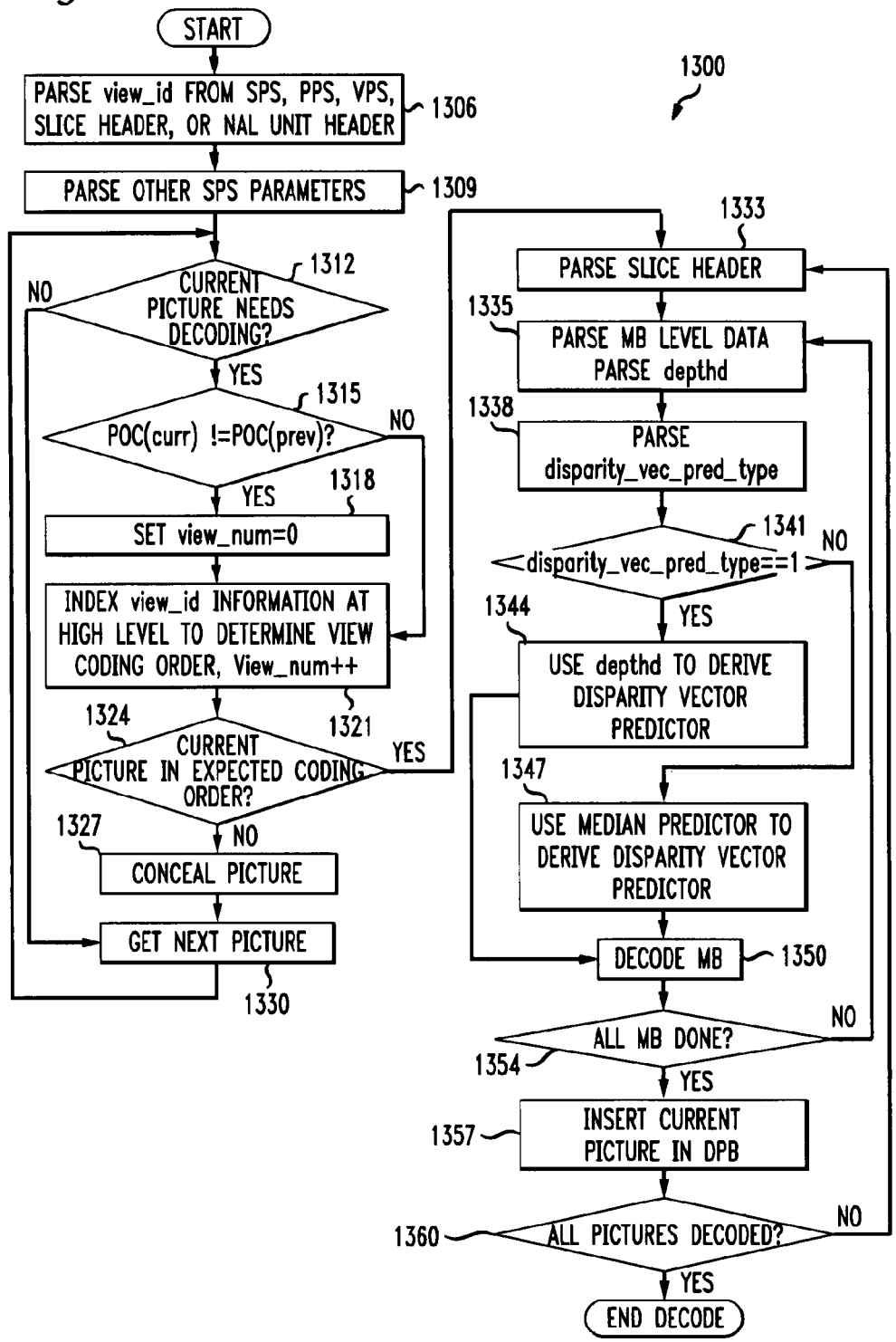
FIG. 13 is a diagram of an implementation of a third decoding process.

FIG. 13 is a flow diagram showing an exemplary method 1300 for decoding using inter-view skip mode with depth in accordance with a third illustrative embodiment.

At step 1306, view_id is parsed from the SPS, PPS, VPS, slice header, or network abstraction layer (NAL) unit header. At step 1309, other SPS parameters are parsed. At step 1312, it is determined whether or not the current picture needs decoding. If so, then control is passed to a step 1315. Otherwise, control is passed to a step 1330.

At step 1315, it is determined whether or not POC (curr)!=POC(prev). If so, then control is passed to a step 1318. Otherwise, control is passed to a step 1321.

At step 1318, view_num is set to 0. At step 1321, view_id information is indexed at a high level to determine view coding order, and view_num is incremented.

At step 1324, it is determined whether or not the current picture is in the expected coding order. If so, then control is passed to a step 1333. Otherwise, control is passed to a step 1327.

At step 1333, the slice header is parsed. At step 1335, the macroblock level data and depthd are parsed. At step 1338, disparity_vec_pred_type is parsed. At step 1341, it is determined whether or not disparity_vec_pred_type is equal to 1. If so, then control is passed to a step 1344. Otherwise, control is passed to a step 1347.

At step 1344, depthd is used to derive the disparity vector predictor.

At step 1347, the median predictor is used to derive the disparity vector predictor.

At step 1350, the current macroblock is decoded. At step 1354, it is determined whether or not all macroblocks are done (being decoded). If so, then control is passed to a step 1357. Otherwise, control is returned to step 1335.

At step 1357, the current picture is inserted in the decoded picture buffer (DPB). At step 1360, it is determined whether or not all pictures have been decoded. If so, then decoding is concluded. Otherwise, control is returned to step 1333.

At step 1327, the current picture is concealed.

At step 1330, the next picture is obtained.

Thus, in accordance with an implementation, we use a depth map to find a corresponding block in another view, and perform depth skip mode using the corresponding block without coding anything. In other implementations, a disparity vector is estimated using pixel comparisons, like you would do to find a motion vector. However, the use of a depth map in accordance with the present principles may be preferable over the pixel comparison approach in situations, for example, in which depth maps yield more accurate disparity vectors as compared to pixel-comparison disparity vectors. Indeed, in typical approaches, a depth map is obtained using a more complex method than simply pixel comparisons, that is, motion estimation style (ME-style) motion matching. Thus, in such cases, a depth map may provide a more accurate indication of disparity than simple ME-style motion matching. Moreover, in such cases, given the accurate indication of disparity, the use of a depth map may improve video coding efficiency.

In accordance with another implementation, we use a depth map to find a corresponding block in another view, and perform motion skip mode where we take the motion vector from the corresponding block and code based on that motion vector (thus, generating a new residue). In a particular implementation, we use a reference from the same view corresponding to a different time. This differs from other approaches in at least the use of a depth map. Also, motion skip analysis as performed by other approaches often uses only a single disparity vector (global disparity vector) for a whole group of pictures (GOP).

In accordance with yet another embodiment, we optimize/refine the depth-map-based disparity vector for better coding results. One such refinement may involve moving the disparity vector within a search window and determining if the rate-distortion improves. Then, the depth-map-based disparity vector is predicted using (at least in part) the actual depth-map-based disparity vector.

Several described embodiments are capable of encoding video data including a depth signal. The depth signal need not be encoded, but may be encoded using, for example, differential encoding and/or entropy encoding. Analogously, several described embodiments are capable of decoding video data including a depth signal, and are capable of processing depth signals or depth values in various ways. Such processing may include, for example, and depending on the implementation, parsing the received depth values and decoding the depth values (assuming that the depth values had been encoded). Note that a processing unit, for processing depth values, may include, for example, (1) a bitstream parser 202, (2) a disparity convertor 203 that is based on depth, and (3) an entropy decoder 205 which may be used in certain implementations to decode depth values that are entropy coded.

Several of the implementations and features described in this application may be used in the context of the H.264/MPEG-4 AVC (AVC) Standard, or the AVC standard with the MVC extension, or the AVC standard with the SVC extension. However, these implementations and features may be used in the context of another standard (existing or future), or in a context that does not involve a standard. We thus provide one or more implementations having particular features and aspects. However, features and aspects of described implementations may also be adapted for other implementations.

Additionally, many implementations may be implemented in one or more of an encoder, a decoder, a post-processor processing output from a decoder, or a pre-processor providing input to an encoder. Further, other implementations are contemplated by this disclosure.

We thus provide one or more implementations having particular features and aspects. However, features and aspects of described implementations may also be adapted for other implementations. Implementations may signal information using a variety of techniques including, but not limited to, SEI messages, slice headers, other high level syntax, non-high-level syntax, out-of-band information, datastream data, and implicit signaling. Accordingly, although implementations described herein may be described in a particular context, such descriptions should in no way be taken as limiting the features and concepts to such implementations or contexts.

Reference in the specification to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding and decoding. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the following claims.

The invention claimed is:

1. An encoding method comprising:
    encoding a portion of a first-view image from a first view in a multiple-view system, the portion being all or part of the first-view image;
    determining that a portion of a second-view image from a second view in the multiple-view system corresponds to the portion of the first-view image, wherein the determination is based on a second-view depth value providing depth information for the portion of the second-view image;
    encoding the portion of the second-view image using information from the encoding of the portion of the first-view image; and
    generating syntax for the portion of the second-view image, wherein the syntax that is generated includes (i) an indication that the portion of the second-view image was encoded using information from the encoding of the portion of the first-view image, and (ii) an indication of the second-view depth value,
    wherein determining that the portion of the second-view image corresponds to the portion of the first-view image comprises using a warping process that includes:
        determining a location of a point in real space based on a position of the point in the portion of the second-view image, and
        determining a position of the point in the portion of the first-view image based on the location of the point in real space.

2. The method of claim 1 wherein the encoded portion of the first-view image, the encoded portion of the second-view image, and the encoded second-view depth value are encoded according to a standard that supports coding of multiple views without supporting coding of depth maps.

3. The method of claim 2 wherein the standard is the Multi-view Video Coding ("MVC") standard.

4. The method of claim 1 further comprising providing the encoded portion of the first-view image, the encoded portion of the second-view image, and the second-view depth value for storage or transmission.

5. The method of claim 4 wherein providing comprises assembling the encoded portion of the first-view image, the encoded portion of the second-view image, and the second-view depth value into a structured format.

6. The method of claim 1 further comprising encoding the second-view depth value.

7. The method of claim 1 wherein the second-view depth value is a single value for a given macroblock or portion of a macroblock.

8. The method of claim 1 further comprising determining a view-difference vector for the portion of the second-view image, the view-difference vector indicating a difference between locations of the portion of the second-view image and of the portion of the first-view image, and the view-difference vector being determined based on the second-view depth value.

9. The method of claim 8 wherein:
determining the view-difference vector is further based on a refinement to make the view-difference vector more suited for encoding, rather than synthesizing.

10. The method of claim 8 further comprising:
forming a view-difference vector predictor based the view-difference vector; and
encoding the view-difference vector based on the view-difference vector predictor.

11. The method of claim 8 further comprising:
forming a view-difference vector predictor based on a depth-derived view-difference vector for the portion of the first-view image; and
encoding the view-difference vector based on the view-difference vector predictor.

12. The method of claim 1 wherein:
encoding the portion of the second-view image comprises setting a flag indicating that the portion of the second-view image is to be reconstructed using a reconstruction of the portion of the first-view image.

13. The method of claim 1 wherein:
encoding the portion of the second-view image comprises using a motion vector from the encoding of the portion of the first-view image, and determining a residue between the portion of the second-view image and a reference image pointed to from the second-view image by the motion vector.

14. The method of claim 1 wherein:
the first-view image comprises a picture from a video sequence, and
encoding the portion of the first-view image comprises encoding a macroblock of the picture.

15. The method of claim 1 wherein at least the second view image is comprised in a video sequence formed from a plurality of images and having at least one view-difference vector for each of the plurality of images.

16. The method of claim 1 wherein at least the second view image is comprised in a video sequence formed from a plurality of images and having multiple view-difference vectors for each one of the plurality of images.

17. The method of claim 1 wherein the method is implemented in an encoder.

18. The method of claim 1 further comprising:
comparing illumination of the portion of the first-view image with illumination of the portion of the second-view image; and
determining an illumination offset for the portion of the second-view image based on a result of the comparing.

19. The method of claim 1 wherein the indication that the portion of the second-view image was encoded using information from the encoding of the portion of the first-view image comprises a flag indicating that the portion of the second-view image is to be reconstructed using a reconstruction of the portion of the first-view image as the reconstruction of the portion of the second-view image.

20. An encoding apparatus comprising:
means for encoding a portion of a first-view image from a first view in a multiple-view system, the portion being all or part of the first-view image;
means for determining that a portion of a second-view image from a second view in the multiple-view system corresponds to the portion of the first-view image, wherein the determination is based on a second-view depth value providing depth information for the portion of the second-view image;
means for encoding the portion of the second-view image using information from the encoding of the portion of the first-view image; and
means for generating syntax for the portion of the second-view image, wherein the syntax that is generated includes (i) an indication that the portion of the second-view image was encoded using information from the encoding of the portion of the first-view image, and (ii) an indication of the second-view depth value,
wherein determining that the portion of the second-view image corresponds to the portion of the first-view image comprises using a warping process that includes:
determining a location of a point in real space based on a position of the point in the portion of the second-view image, and
determining a position of the point in the portion of the first-view image based on the location of the point in real space.

21. A non-transitory processor readable medium having stored thereon instructions for causing a processor to perform at least the following:
encoding a portion of a first-view image from a first view in a multiple-view system, the portion being all or part of the first-view image;
determining that a portion of a second-view image from a second view in the multiple-view system corresponds to the portion of the first-view image, wherein the determination is based on a second-view depth value providing depth information for the portion of the second-view image;
encoding the portion of the second-view image using information from the encoding of the portion of the first-view image; and
generating syntax for the portion of the second-view image, wherein the syntax that is generated includes (i) an indication that the portion of the second-view image was encoded using information from the encoding of the portion of the first-view image, and (ii) an indication of the second-view depth value,
wherein determining that the portion of the second-view image corresponds to the portion of the first-view image comprises using a warping process that includes:
determining a location of a point in real space based on a position of the point in the portion of the second-view image, and
determining a position of the point in the portion of the first-view image based on the location of the point in real space.

22. An apparatus, comprising a processor configured to perform at least the following:
encoding a portion of a first-view image from a first view in a multiple-view system, the portion being all or part of the first-view image;
determining that a portion of a second-view image from a second view in the multiple-view system corresponds to the portion of the first-view image, wherein the determination is based on a second-view depth value providing depth information for the portion of the second-view image;

encoding the portion of the second-view image using information from the encoding of the portion of the first-view image; and generating syntax for the portion of the second-view image, wherein the syntax that is generated includes (i) an indication that the portion of the second-view image was encoded using information from the encoding of the portion of the first-view image, and (ii) an indication of the second-view depth value, wherein determining that the portion of the second-view image corresponds to the portion of the first-view image comprises using a warping process that includes:

determining a location of a point in real space based on a position of the point in the portion of the second-view image, and determining a position of the point in the portion of the first-view image based on the location of the point in real space.

23. An encoding apparatus comprising:

a disparity converter for determining that a portion of a second-view image from a second view in a multiple-view system corresponds to a portion of a first-view image from a first view in the multiple-view system, the portion of the first-view image being all or part of the first-view image, wherein the determination is based on a second-view depth value providing depth information for the portion of the second-view image; and an encoding unit for encoding the portion of the first-view image, and for encoding the portion of the second-view image using information from the encoding of the portion of the first-view image, and for generating syntax for the portion of the second-view image, wherein the syntax that is generated includes (i) an indication that the portion of the second-view image was encoded using information from the encoding of the portion of the first-view image, and (ii) an indication of the second-view depth value, wherein determining that the portion of the second-view image corresponds to the portion of the first-view image comprises using a warping process that includes:

determining a location of a point in real space based on a position of the point in the portion of the second-view image, and determining a position of the point in the portion of the first-view image based on the location of the point in real space.

24. The apparatus of claim 23 further comprising an output unit for providing the encoded portion of the first-view image, the encoded portion of the second-view image, the second-view depth value, and the generated syntax for storage or transmission.

25. The method of claim 23 wherein the indication that the portion of the second-view image was encoded using information from the encoding of the portion of the first-view image comprises a flag indicating that the portion of the second-view image is to be reconstructed using a reconstruction of the portion of the first-view image as the reconstruction of the portion of the second-view image.

26. An apparatus comprising:

a disparity converter for determining that a portion of a second-view image from a second view in a multiple-view system corresponds to a portion of a first-view image from a first view in the multiple-view system, the portion of the first-view image being all or part of the first-view image, wherein the determination is based on a second-view depth value providing depth information for the portion of the second-view image; and an encoding unit for encoding the portion of the first-view image, and for encoding the portion of the second-view image using information from the encoding of the portion of the first-view image, and for generating syntax for the portion of the second-view image, wherein the syntax that is generated includes (i) an indication that the portion of the second-view image was encoded using information from the encoding of the portion of the first-view image, and (ii) an indication of the second-view depth value, wherein determining that the portion of the second-view image corresponds to the portion of the first-view image comprises using a warping process that includes:

determining a location of a point in real space based on a position of the point in the portion of the second-view image, and determining a position of the point in the portion of the first-view image based on the location of the point in real space; and a modulator for modulating a signal that includes the encodings of the portion of the first-view image and the portion of the second-view image.

27. A non-transitory processor readable medium having stored thereon a video signal structure, comprising:

a first-view image section including coded information for a portion of a first-view image from a first view in a multiple-view system, the portion being all or part of the first-view image;

a flag section including a flag indicating that a portion of a second-view image from a second view in the multiple-view system that corresponds to the portion of the first-view image is to be reconstructed using a reconstruction of the portion of the first-view image as the reconstruction of the portion of the second-view image; and a second-view depth section including information for a second-view depth value providing depth information for the portion of the second-view image, wherein the depth information for the portion of the second-view image can be used to determine the corresponding portion of the first-view image, wherein the first-view image section, the flag section, and the second-view depth section are formatted according to a standard that supports coding of multiple views without supporting coding of depth maps.

28. A decoding method comprising:

decoding an encoding of a portion of a first-view image from a first view in a multiple-view system, the portion being all or part of the first-view image;

accessing syntax that includes (i) an indication that a portion of a second-view image from a second view in the multiple-view system was encoded using information from an encoding of a corresponding portion of the first-view image, and (ii) an indication of a second-view depth value providing depth information for the portion of the second-view image wherein the depth information can be used to determine the corresponding portion of the first-view image;

determining that the portion of the second-view image corresponds to the portion of the first-view image and is encoded using information from the encoding of the portion of the first-view image, wherein the determination is based on the indication of the second-view depth value and the indication that the portion of the second-view image was encoded using information from an encoding of a corresponding portion of the first-view image; and decoding the encoding of the portion of the second-view image using information from the decoded portion of the first-view image, wherein decoding the portion of the second-view image comprises reading a flag indicating that the portion of the second-view image is to be reconstructed using a reconstruction of the portion of the first-view image as the reconstruction of the portion of the second-view image.

29. The method of claim 28 further comprising:

accessing an illumination offset indicating a difference between illumination of the portion of the first-view image and illumination of the portion of the second-view image; and adjusting the illumination of a reconstruction of the portion of the second-view image based on the illumination offset.

30. The method of claim 28 wherein:

decoding the portion of the second-view image comprises using a motion vector from the decoded portion of the first-view image, and determining a residue between the portion of the second-view image and a reference image pointed to from the second-view image by the motion vector.

31. The method of claim 28 further comprising processing the second-view depth value.

32. The method of claim 31 wherein processing the second-view depth value comprises one or more of parsing the second-view depth value from a received signal or decoding the second-view depth value.

33. The method of claim 28 wherein the encoded portion of the first-view image and the encoded portion of the second-view image are received in a format structured according to a standard that supports coding of multiple views without supporting coding of depth maps.

34. The method of claim 33 wherein the standard is the MVC standard.

35. The method of claim 28 wherein the second-view depth value is a single value for a given macroblock or portion of a macroblock.

36. The method of claim 28 further comprising determining a view-difference vector for the portion of the second-view image, the view-difference vector indicating a difference between locations of the portion of the second-view image and of the portion of the first-view image, and the view-difference vector being determined based on the second-view depth value.

37. The method of claim 28 further comprising:

forming a view-difference vector predictor for the portion of the second-view image, the view-difference vector predictor indicating a difference between locations of the portion of the second-view image and of the portion of the first-view image, and the view-difference vector predictor being determined based on the second-view depth value; and decoding a view-difference vector based on the view-difference vector predictor.

38. The method of claim 28 further comprising:

forming a view-difference vector predictor based on a depth-derived view-difference vector for the portion of the first-view image; and decoding a view-difference vector based on the view-difference vector predictor.

39. The method of claim 28 wherein the method is implemented in a decoder.

40. The method of claim 28 wherein the method is implemented in an encoder as part of an encoding process.

41. The method of claim 28 wherein determining that the portion of the second-view image corresponds to the portion of the first-view image comprises using a warping process that includes:

determining a location of a point in real space based on a position of the point in the portion of the second-view image; and determining a position of the point in the portion of the first-view image based on the location of the point in real space.

42. A decoding apparatus comprising:

means for decoding an encoding of a portion of a first-view image from a first view in a multiple-view system, the portion being all or part of the first-view image;

means for accessing syntax that includes (i) an indication that a portion of a second-view image from a second view in the multiple-view system was encoded using information from an encoding of a corresponding portion of the first-view image, and (ii) an indication of a second-view depth value providing depth information for the portion of the second-view image wherein the depth information can be used to determine the corresponding portion of the first-view image;

means for determining that the portion of the second-view image corresponds to the portion of the first-view image and is encoded using information from the encoding of the portion of the first-view image, wherein the determination is based on the indication of the second-view depth value and the indication that the portion of the second-view image was encoded using information from an encoding of a corresponding portion of the first-view image; and means for decoding the encoding of the portion of the second-view image using information from the decoded portion of the first-view image, wherein decoding the portion of the second-view image comprises reading a flag indicating that the portion of the second-view image is to be reconstructed using a reconstruction of the portion of the first-view image as the reconstruction of the portion of the second-view image.

43. A non-transitory processor readable medium having stored thereon instructions for causing a processor to perform at least the following:

decoding an encoding of a portion of a first-view image from a first view in a multiple-view system, the portion being all or part of the first-view image;

accessing syntax that includes (i) an indication that a portion of a second-view image from a second view in the multiple-view system was encoded using information from an encoding of a corresponding portion of the first-view image, and (ii) an indication of a second-view depth value providing depth information for the portion of the second-view image wherein the depth information can be used to determine the corresponding portion of the first-view image;

determining that the portion of a the second-view image corresponds to the portion of the first-view image and is encoded using information from the encoding of the portion of the first-view image, wherein the determination is based on the indication of the second-view depth value and the indication that the portion of the second-view image was encoded using information from an encoding of a corresponding portion of the first-view image; and decoding the encoding of the portion of the second-view image using information from the decoded portion of the first-view image, wherein decoding the portion of the second-view image comprises reading a flag indicating that the portion of the second-view image is to be reconstructed using a reconstruction of the portion of the first-view image as the reconstruction of the portion of the second-view image.

44. An apparatus, comprising a processor configured to perform at least the following:

decoding an encoding of a portion of a first-view image from a first view in a multiple-view system, the portion being all or part of the first-view image;

accessing syntax that includes (i) an indication that a portion of a second-view image from a second view in the multiple-view system was encoded using information from an encoding of a corresponding portion of the first-view image, and (ii) an indication of a second-view depth value providing depth information for the portion of the second-view image wherein the depth information can be used to determine the corresponding portion of the first-view image;

determining that the portion of the second-view image corresponds to the portion of the first-view image and is encoded using information from the encoding of the portion of the first-view image, wherein the determination is based on the indication of the second-view depth value and the indication that the portion of the second-view image was encoded using information from an encoding of a corresponding portion of the first-view image; and decoding the encoding of the portion of the second-view image using information from the decoded portion of the first-view image, wherein decoding the portion of the second-view image comprises reading a flag indicating that the portion of the second-view image is to be reconstructed using a reconstruction of the portion of the first-view image as the reconstruction of the portion of the second-view image.

45. A decoding apparatus comprising:

a decoding unit for decoding syntax that includes (i) a coding indication that indicates that a portion of a second-view image from a second view in a multiple-view system was encoded using information from an encoding of a corresponding portion of a first-view image from a first view in the multiple-view system, and (ii) a depth indication that indicates a second-view depth value providing depth information for the portion of the second-view image wherein the depth information can be used to determine a position of the corresponding portion of the first-view image; and a disparity converter for determining the position of the corresponding portion of a the first-view image, the portion of the first-view image being all or part of the first-view image, wherein the determination is based on the coding indication and the depth indication, wherein the decoding unit is further for decoding the encoding of the corresponding portion of the first-view image, and for decoding an encoding of the portion of the second-view image using information from the decoded portion of the corresponding portion of the first-view image, and wherein decoding the portion of the second-view image comprises reading a flag indicating that the portion of the second-view image is to be reconstructed using a reconstruction of the portion of the first-view image as the reconstruction of the portion of the second-view image.

46. The apparatus of claim 45 wherein determining that the portion of the second-view image corresponds to the portion of the first-view image comprises using a warping process that includes:

determining a location of a point in real space based on a position of the point in the portion of the second-view image; and determining a position of the point in the portion of the first-view image based on the location of the point in real space.

47. An apparatus comprising:

a demodulator for receiving and demodulating a signal, the signal including an encoding of a portion of a first-view image from a first view in a multiple-view system, the portion of the first-view image being all or part of the first-view image, and the signal including an encoding of a portion of a second-view image from a second view in the multiple-view system, and the signal including syntax that includes (i) a coding indication that indicates that the portion of the second-view image was encoded using information from an encoding of a corresponding portion of the first-view image, and (ii) a depth indication that indicates a second-view depth value providing depth information for the portion of the second-view image wherein the depth information can be used to determine the corresponding portion of the first-view image;

a disparity converter for determining that the portion of the second-view image corresponds to the portion of the first-view image and is encoded using information from the encoding of the portion of the first-view image, wherein the determination is based on the depth indication and the coding indication; and a decoding unit for decoding the encoding of the portion of the first-view image, and for decoding the encoding of the portion of the second-view image using information from the decoded portion of the first-view image, and wherein decoding the portion of the second-view image comprises reading a flag indicating that the portion of the second-view image is to be reconstructed using a reconstruction of the portion of the first-view image as the reconstruction of the portion of the second-view image.

* * * * *